US009643692B2

(12) United States Patent
Covington

(10) Patent No.: US 9,643,692 B2
(45) Date of Patent: May 9, 2017

(54) APPARATUS AND METHODS FOR RECOVERING OIL FROM A BODY OF WATER

(71) Applicant: Ocean Cleaner, LLC, Orange, TX (US)

(72) Inventor: Russell S Covington, Orange, TX (US)

(73) Assignee: Ocean Cleaner, LLC, Orange, TX (US)

( * ) Notice: Subject to any disclaimer, the term of this patent is extended or adjusted under 35 U.S.C. 154(b) by 0 days.

(21) Appl. No.: 14/881,394

(22) Filed: Oct. 13, 2015

(65) Prior Publication Data

US 2016/0114865 A1   Apr. 28, 2016

Related U.S. Application Data

(60) Provisional application No. 62/064,776, filed on Oct. 16, 2014.

(51) Int. Cl.
*E02B 15/04* (2006.01)
*B63B 35/32* (2006.01)

(52) U.S. Cl.
CPC ............ B63B 35/32 (2013.01); *E02B 15/047* (2013.01); *E02B 15/048* (2013.01)

(58) Field of Classification Search
CPC .... E02B 15/046; E02B 15/047; E02B 15/048; B63B 35/32
USPC ...... 210/747.6, 776, 170.05, 170.09, 170.11, 210/242.3, 923
See application file for complete search history.

(56) References Cited

U.S. PATENT DOCUMENTS

| 1,591,024 | A | * | 7/1926 | Dodge | ................. E02B 15/046 210/242.3 |
| 2,891,672 | A | * | 6/1959 | Veld | ...................... E02B 15/106 210/242.3 |
| 3,667,235 | A | | 6/1972 | Preus et al. | |
| 3,701,430 | A | | 10/1972 | Tuttle | |
| 3,847,816 | A | * | 11/1974 | DiPerna | ................ E02B 15/046 210/242.3 |
| 3,926,812 | A | | 12/1975 | Neal | |
| 3,983,034 | A | | 9/1976 | Wilson | |

(Continued)

FOREIGN PATENT DOCUMENTS

| GB | 2287000 A | 9/1995 |
| WO | 95/21764 A1 | 8/1995 |
| WO | 2014158391 A1 | 10/2014 |

OTHER PUBLICATIONS

"Oil Skimmer 'The Big Gulp'", 2 pages, News Item Reported by Fox News 8, John Snell, Anchor, http://ladcompanies.com/index.php/home/news/101-oil-skimmer-qthe-big-gulpq.html, 2 pp.

(Continued)

*Primary Examiner* — Christopher Upton
(74) *Attorney, Agent, or Firm* — E. Randall Smith; E. Randall Smith, P.C.

(57) ABSTRACT

System for collecting oil on a waterborne vessel from an oil spill area at or near the surface of a body of water includes at least three successively fluidly coupled cargo compartments. At least one suction conduit is fluidly coupled to each cargo compartment and configured to allow each successive cargo compartment to be concurrently substantially emptied of sea water and substantially filled with oil, starting with the aft-most cargo compartment.

19 Claims, 12 Drawing Sheets

(56) References Cited

U.S. PATENT DOCUMENTS

| | | | |
|---|---|---|---|
| 4,033,876 A | | 7/1977 | Cocjin et al. |
| 4,054,525 A | | 10/1977 | Propp |
| 4,120,793 A | * | 10/1978 | Strain .................. E02B 15/046 210/923 |
| 4,211,659 A | | 7/1980 | Nyfeld et al. |
| 4,264,444 A | | 4/1981 | Bronnec |
| 4,308,140 A | * | 12/1981 | Pierson, Jr. ........... E02B 15/046 210/242.3 |
| 4,381,994 A | | 5/1983 | Ayers |
| 4,545,315 A | | 10/1985 | Becherer |
| 4,959,143 A | | 9/1990 | Koster |
| 5,043,065 A | | 8/1991 | Propp |
| 5,047,156 A | | 9/1991 | Sullivan |
| 5,102,540 A | | 4/1992 | Conradi et al. |
| 5,194,151 A | * | 3/1993 | Broussard ............. E02B 15/046 210/242.3 |
| 5,292,430 A | * | 3/1994 | Sullivan ................ E02B 15/046 210/242.3 |
| 5,688,075 A | | 11/1997 | Gradek |
| 5,893,978 A | | 4/1999 | Yoda et al. |
| 8,318,012 B2 | | 11/2012 | Dragna |
| 2003/0132154 A1 | | 7/2003 | Morin |
| 2013/0032524 A1 | | 2/2013 | Dragna |
| 2014/0165894 A1 | | 6/2014 | Gastaldi et al. |

OTHER PUBLICATIONS

"Oil Whale How it Works", Copyright 2016 by Oilwhale Oy, http://www.oilwhale.fi/how-it-works/, 5 pp.

Patzek, Tad W., "Energy and Environment Subcommittee of the Energy and Commerce Committee Jun. 9, 2010 Briefing", Jun. 8, 2010, 16 pp.

Ecooceane Products, http://ecooceane.com/products/, 7 pp.

Oil Spill Recover Europe Ltd., YouTube video demonstration page and company information, 7 pp.

* cited by examiner

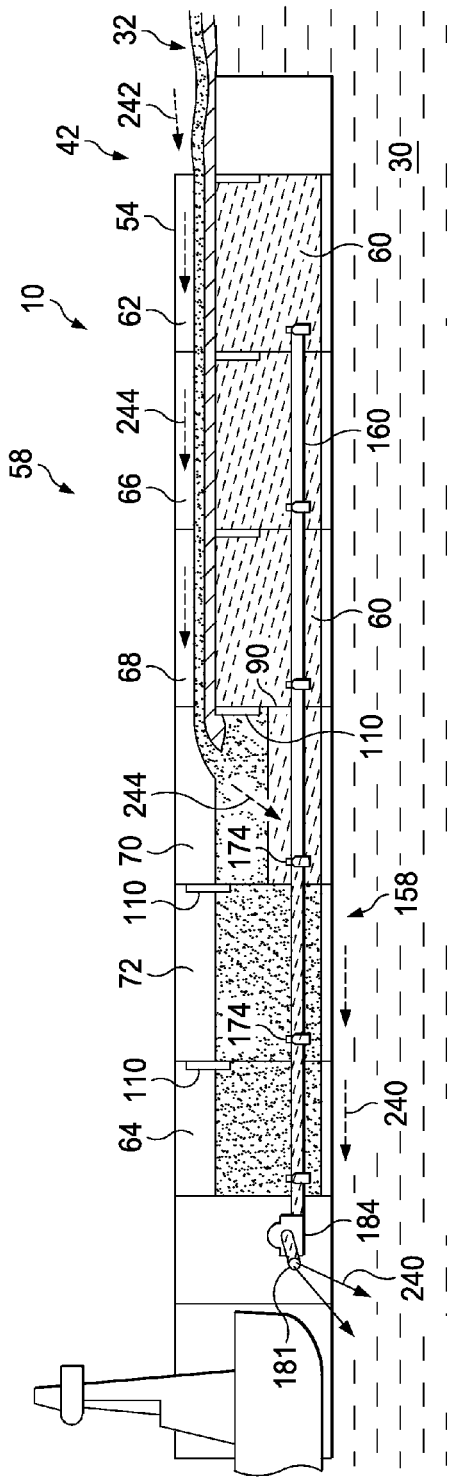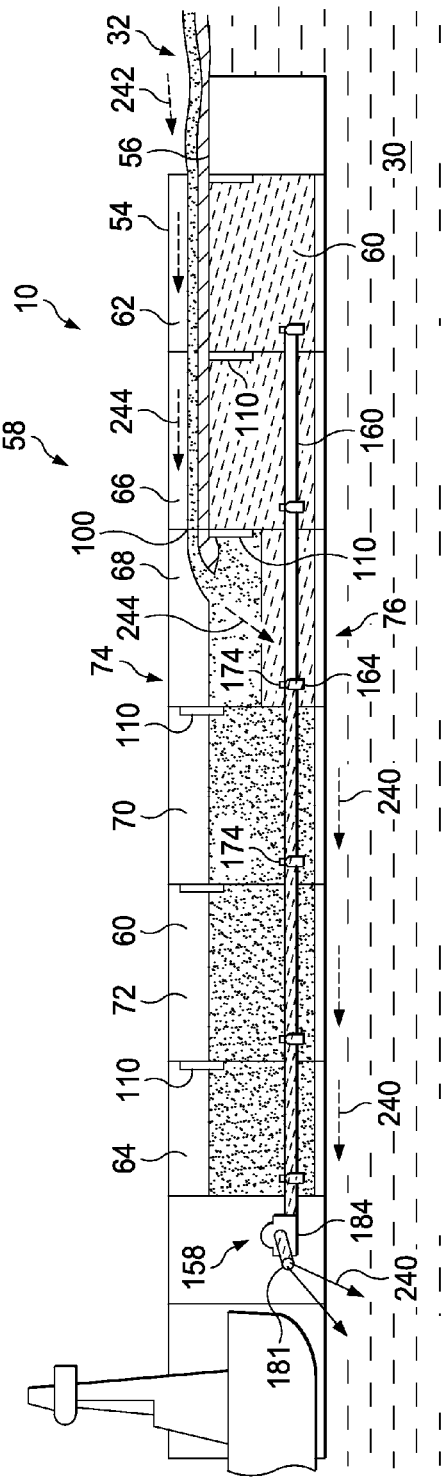

APPARATUS AND METHODS FOR RECOVERING OIL FROM A BODY OF WATER

CROSS REFERENCE TO RELATED APPLICATIONS

The present application claims priority to U.S. Provisional Patent Application Ser. No. 62/064,776, filed on Oct. 16, 2014 and entitled "System, Apparatus and Methods for Collecting Debris from a Body of Water", which is hereby incorporated by reference herein in its entirety.

FIELD OF THE DISCLOSURE

The present disclosure relates generally to recovering floating debris or contaminants from a body of water.

BACKGROUND

Historically, it has proven difficult to effectively and efficiently remove substantial amounts of floating debris, or contaminants, from the ocean and other bodies of water. Some variables that may hinder such recovery efforts include the large amount of debris often needed to be recovered, the rapid speed at which the debris spreads, the effect of wind, waves, rough seas and other environmental factors on the recovery operations and the limited size and/or capacity of existing recovery vessels.

In the offshore oil spill recovery arena, for example, various existing oil skimmers are believed to be unable to separate out significant amounts (or any) of the collected oil from sea water and thus have limited oil recovery capacity. Other existing oil skimmers attempt to separate the recovered oil from sea water, but are slow and thus largely ineffective at recovering substantial volumes of oil.

It should be understood that the above-described features, capabilities and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of their mention above.

Accordingly, there exists a need for improved systems, apparatus and methods useful in connection with debris recovery operations having one or more of the attributes or capabilities described or shown in, or as may be apparent from, the other portions of this patent.

BRIEF SUMMARY OF THE DISCLOSURE

In some embodiments, the present disclosure involves an oil recovery vessel useful for collecting oil floating in a body of water in an oil spill area at or near the surface of the body of water. The vessel includes a plurality of distinct cargo compartments positioned adjacent to one another along at least part of the length of the vessel and arranged and adapted to contain sea water and oil. A front the cargo compartment is disposed closest to the front of the vessel and a rear the cargo compartment is disposed closest to the rear of the vessel. The front cargo compartment is separated from the front end of the vessel by at least one front vertical wall. Each adjacent pair of cargo compartments is separated by at least one other vertical wall. Each vertical wall includes at least one opening formed therein proximate to the upper end thereof. Each opening is arranged and adapted to allow the flow of liquid through the associated vertical wall and into the adjacent cargo compartment aft of the vertical wall.

These embodiments include a plurality of gates. Each gate allows and disallows liquid flow through at least one of the openings. Each gate is selectively movable between at least one open and at least one closed position. At least one suction conduit is fluidly coupled to each cargo compartment to concurrently allow water to be removed from, and oil to enter, any of them. The vessel also includes at least one at least partially floating, elongated, boom disposed proximate to the front of the vessel. Each boom is arranged and adapted to encourage oil to flow into the front cargo compartment from the body of water.

In various embodiments, the present disclosure involves a system for collecting oil on a waterborne vessel from an oil spill area at or near the surface of a body of water. The system includes at least three successively fluidly coupled cargo compartments configured to initially hold sea water and thereafter hold oil. A front cargo compartment is disposed closest to the front of the vessel and a rear cargo compartment is disposed closest to the rear of the vessel. At least one intermediate cargo compartment is disposed between the front and rear cargo compartments.

The system of these embodiments also includes a plurality of fluid passageways. At least a first fluid passageway fluidly couples the front cargo compartment to the body of water and is configured to allow the flow of liquid into the front cargo compartment from the body of water. At least a second fluid passageway fluidly couples the front and the forward-most intermediate cargo compartment and is configured to allow the flow of liquid from the front cargo compartment into the forward-most intermediate cargo compartment. If there is more than one intermediate cargo compartment, at least a third fluid passageway fluidly couples each pair of successively fluidly coupled intermediate cargo compartments in the direction of the rear end of the vessel and is configured to allow liquid flow from the forward-most of each such pair of intermediate cargo compartments to the aft-most of each such pair of intermediate cargo compartments. At least one other fluid passageway fluidly couples the aft-most intermediate cargo compartment and the rear cargo compartment to allow liquid flow into the rear cargo compartment from the aft-most intermediate cargo compartment.

The system of these embodiments also includes at least one suction conduit fluidly coupled to each cargo compartment and configured to allow each cargo compartment to be concurrently at least substantially emptied of sea water and at least substantially filled with oil, starting with the rear cargo compartment. At least one fluid discharge pump is fluidly coupled to the suction conduit(s) and arranged and adapted to concurrently draw sea water out of each cargo compartment through the suction conduit(s) and draw oil into that cargo compartment through at least one associated passageway until that cargo compartment is substantially full of oil, starting with the rear cargo compartment and ending with the front cargo compartment.

There are embodiments of the present disclosure that involve a method of collecting oil on a waterborne vessel from an oil spill area at or near the surface of a body of water. At least three fluidly interconnected cargo compartments on the vessel are at least substantially filled with sea water. A front cargo compartment is disposed closest to the front end of the vessel, a rear cargo compartment is disposed closest to the rear end of the vessel and at least one intermediate cargo compartment is disposed between the front and rear cargo compartments. The front end of the vessel is positioned in or adjacent to the oil spill area. At least a first fluid passageway allows oil and some sea water to enter the front cargo compartment proximate to the upper end thereof from the body of water. Additional fluid passageways allow oil and some sea water to pass from the front cargo compartment into each successively fluidly coupled cargo compartment proximate to the upper end thereof (in the direction of the rear end of the vessel), respectively. At least one fluid discharge pump concurrently pumps sea water out of the rear cargo compartment through at least one suction conduit and allows oil and some sea water to enter the rear cargo compartment from the aft-most intermediate cargo compartment.

After the rear cargo compartment is substantially filled with oil, the rear cargo compartment is fluidly isolated from the other cargo compartments. At least one fluid discharge pump concurrently pumps sea water out of the aft-most intermediate cargo compartment through at least one suction conduit and allows oil and some sea water to enter the aft-most intermediate cargo compartment from the cargo compartment fluidly coupled thereto on its forward side. After the aft-most intermediate cargo compartment is substantially filled with oil, the aft-most intermediate cargo compartment is fluidly isolated from the other substantially water filled cargo compartments. These acts are repeated for any additional intermediate cargo compartments and then the front cargo compartment. After the front cargo compartment is substantially filled with oil, it is fluidly isolated from the body of water.

Accordingly, the present disclosure includes features and advantages which are believed to enable it to advance debris recovery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 15 is a side view of the exemplary vessel of FIG. 1 with the side shell removed to show exemplary interior cargo compartments and other components during exemplary debris recovery operations in accordance with an embodiment of the present disclosure;

FIG. 16 is a side view of the exemplary vessel of FIG. 1 with the side shell removed to show exemplary interior cargo compartments and other components during exemplary debris recovery operations in accordance with an embodiment of the present disclosure;

DETAILED DESCRIPTION OF PRESENTLY PREFERRED EMBODIMENTS

Figure 1:
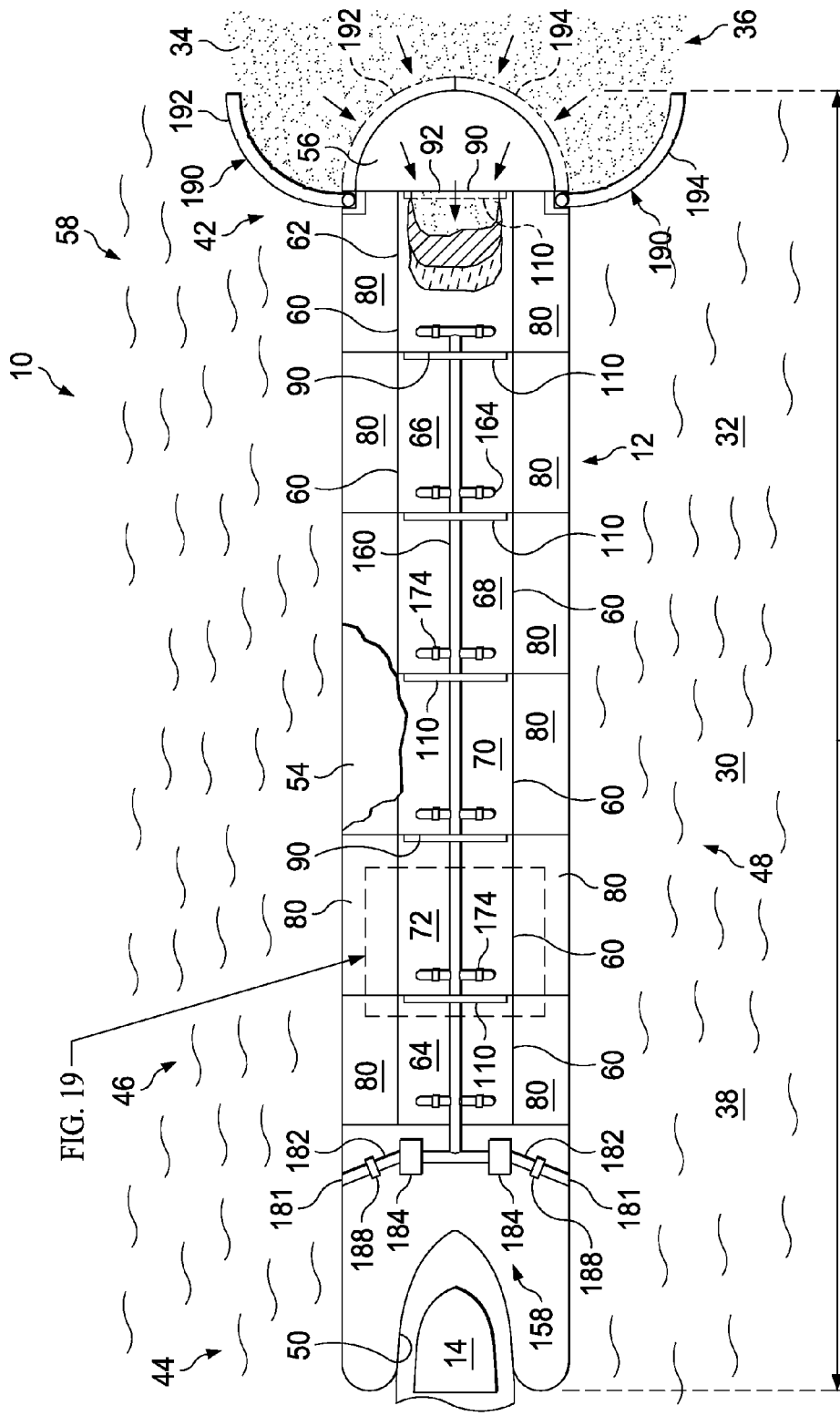
FIG. 1 is a top view of an exemplary debris recovery vessel in accordance with an embodiment of the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an exemplary debris recovery vessel 10 in accordance with an embodiment of the present disclosure is shown in a body of water 30. In this example, the debris to be recovered is a contaminant, such as floating oil 34. However, the vessel 10 may be used to recover any other form of floating contaminants or debris. It should be noted, the terms "debris" and "contaminant" are used interchangeably herein. In other words, the "debris" being recovered may sometimes be referred to herein as a "contaminant", whether or not it actually formally contaminates the body of water 30. For example, the debris may include one or more substances, materials or a combination thereof, such as floating chemicals and particulate pollutants (e.g. plastic debris and micro plastics as presently found in the Great Pacific Garbage Patch). Moreover, the present disclosure and appended claims are not limited to by type of debris or contaminants, unless and only to the extent as may be expressly provided in a particular claim and only for that claims and other claims depending therefrom.

The vessel 10 may be arranged and adapted to be used in any type of body of water 30. For example, the body of water 30 may be any inland or offshore waterway, such as a sea or ocean, bay, sound, inlet, river, lake, canal or the like. The nature and type of the body of water 30 is not limiting upon the present disclosure. For convenience, the water in the body of water 30 is referred to herein as "sea water" 38, even though it may not actually be sea water, depending upon the type of body of water 30. For example, in some cases, the "sea water 38" as referenced herein may be fresh water from an inland body of water, such as a lake.

The illustrated vessel 10 is useful for collecting oil 34 floating in the body of water 30 in a debris field, or oil spill area, 36 at or near the surface 32 of body of water 30. For the purposes of the description below and the appended claims, the oil spill area 36 can be characterized as generally having a top layer of floating oil, followed by a lower layer of oil contaminated sea water ("oily water") followed by sea water, particularly when there is turbulence in the water from wind, waves, vessels moving through the oil spill area 36 or other causes. It should be noted, however, that such "layering" is a general description and the actual disposition of oil and other substances and materials in moving sea water 38 is dynamic and thus constantly changing.

In this embodiment, the vessel 10 includes a front or forward end 42, a rear or aft end 44, a left or port side 46, a right or starboard side 48 and is moveable across the surface 32 of the body of water 30 to, from and through the oil spill area 36. The front end 42 of the illustrated vessel 10 is shown having a curved shape, but could instead have a straight, rectangular or any other desired shape.

The vessel 10 may be self-propelled or have any other suitable propulsion arrangement. In this example, the vessel 10 is a ship shape tanker barge 12 moved by a primary mover, such as a tug boat 14, in an integrated tug/barge arrangement. The illustrated tug 14 inserts into the barge 12 at a slot 50 at the rear end 44 of the barge 12. Other embodiments of the vessel 10 may be a self-propelled tanker or other ship, a barge moved by a tanker ship or any other type of waterborne vessel. Furthermore, the vessel 10 may be a retrofit or a new vessel. Thus, the present disclosure is not limited by the nature and type of vessel 10 or how it is propelled in the body of water 30.

Still referring to FIG. 1, in accordance with an embodiment of the present disclosure, the vessel 10 includes a debris recovery system 58 having a plurality of distinct, successively fluidly coupled cargo compartments 60. As used herein and in the appended claims, the terms "successive" and variations thereof means one after the other. In the above instance, for example, the cargo compartments 60 are fluidly coupled in succession, or one after the other. So a first compartment is fluidly coupled to a second compartment, which is fluidly coupled to a third compartment and so on. In the present embodiment, the exemplary cargo compartments 60 are positioned proximate or adjacent to one another along at least part of the length 52 of the vessel 10 and below the top deck 54. Each exemplary cargo compartment 60 is arranged and adapted to contain fluid (e.g. sea water 38 and oil 34).

Any desired number of cargo compartments 60 may be included. In this example, a front, or first, cargo compartment 62 is closest to the front end 42 of the vessel 10, a rearmost, or sixth, cargo compartment 64 is closest to the rear end 44 of the vessel 10 and four intermediate cargo compartments 60 (the second 66, third 68, fourth 70 and fifth 72 cargo compartments) are positioned therebetween. However, there may be fewer or more cargo compartments 60. Some embodiments may include cargo compartments 60 that are side-by-side and/or multiple rows of cargo compartments 60. The present disclosure is not limited by the number, size, location and configuration of cargo compartments 60.

The cargo compartments 60 may have any suitable size, shape and dimensions. For example, in some embodiments, the exemplary cargo compartments 60 each have a height of 45 feet, a width of 50 feet and a length of 75 feet.

If desired, the vessel 10 may have additional compartments. For example, the illustrated barge 12 is a double-hull tanker that includes outer compartments surrounding the cargo compartments 60, such as one or more side ballast tanks 80, a forward void 84 (e.g. FIG. 2), a rear void 86 (e.g. FIG. 2) and one or more inner bottom tanks 88 (e.g. FIG. 2). These additional compartments may be used for any suitable purpose. For example, one or more of the ballast tanks 80 may be loaded and/or unloaded during debris recovery operations with sea water to obtain and maintain the desired height of the vessel 10 in the body of water 30. However, the inclusion, quantity, type, configuration, location and use of additional compartments is not limiting upon the present disclosure.

Still referring to the embodiment of FIG. 1, each adjacent pair of illustrated cargo compartments 60 is separated by at least one vertical wall, or bulkhead, 90. At least one vertical wall, or bulkhead, 90 also separates the exemplary front cargo compartment 62 from the front end 42 of the vessel 10 and the body of water 30, and may sometimes be referred to herein as the front vertical wall 92.

Figure 3:
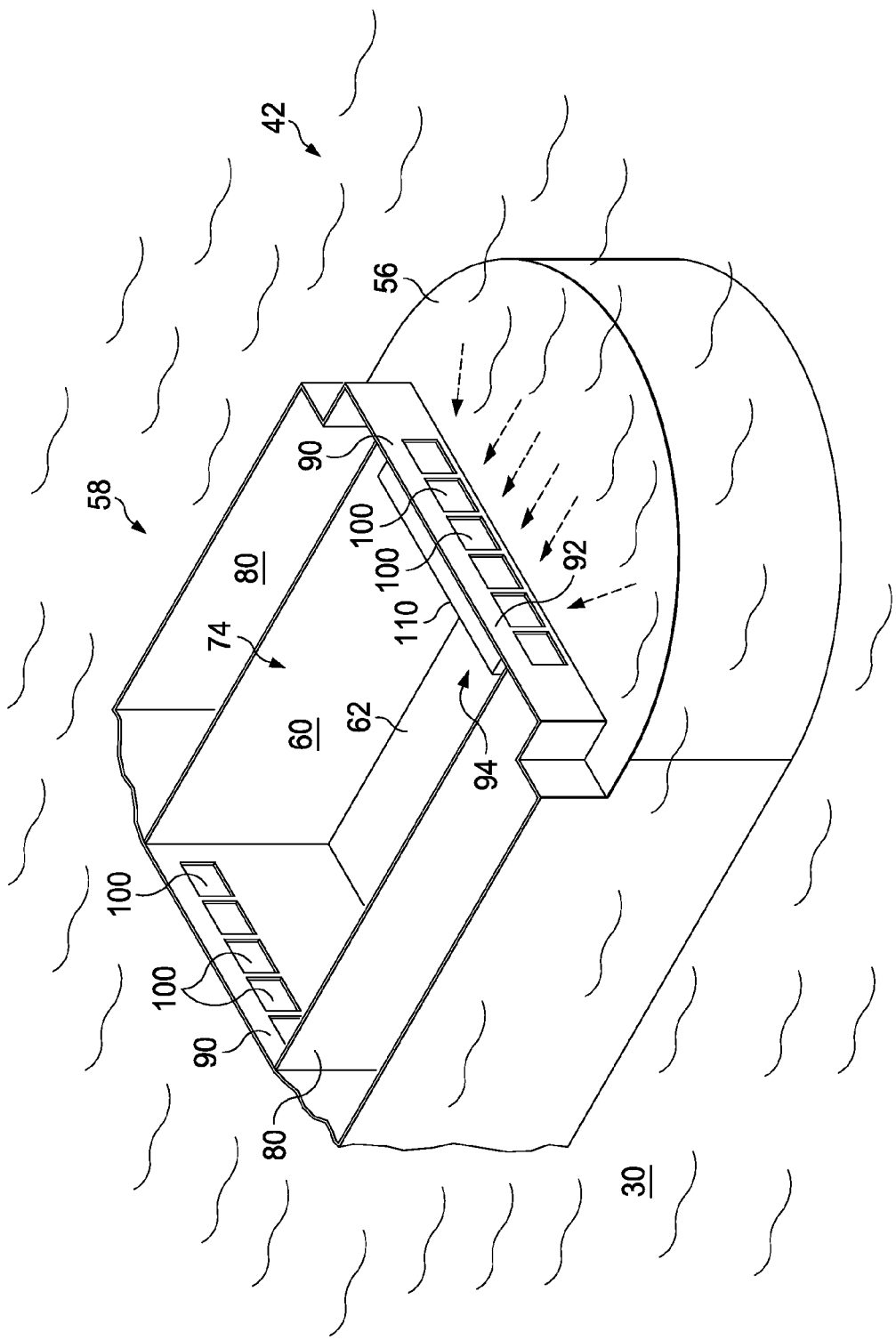
FIG. 3 is a perspective view of part of the front end of the exemplary vessel of FIG. 1.
Figure 4:
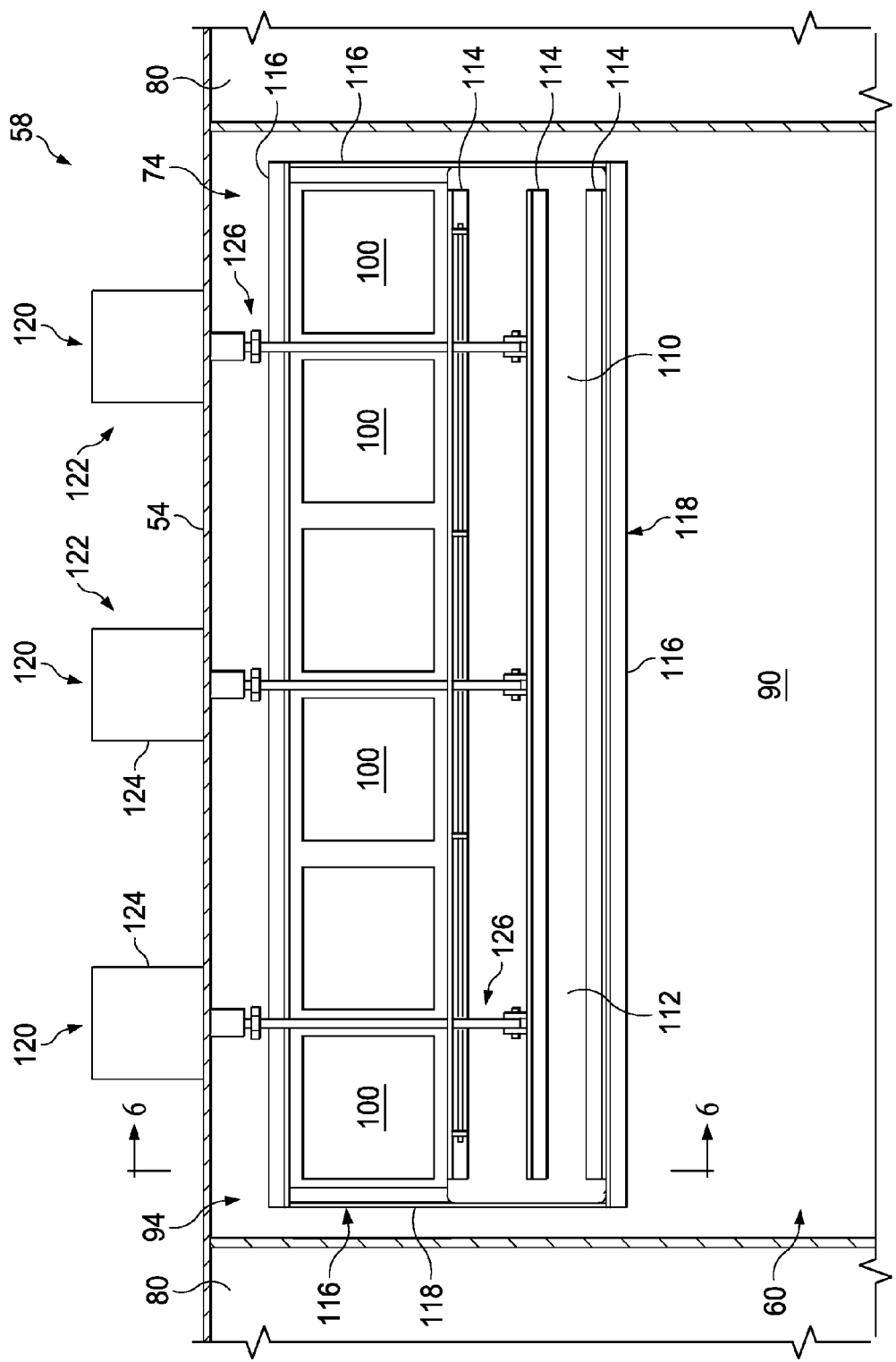
FIG. 4 is a view facing an exemplary vertical wall disposed between cargo compartments of the embodiment of FIG. 1 from inside one of the cargo compartments (facing rearwards) and showing an exemplary associated gate in a fully open position.
Figure 5:
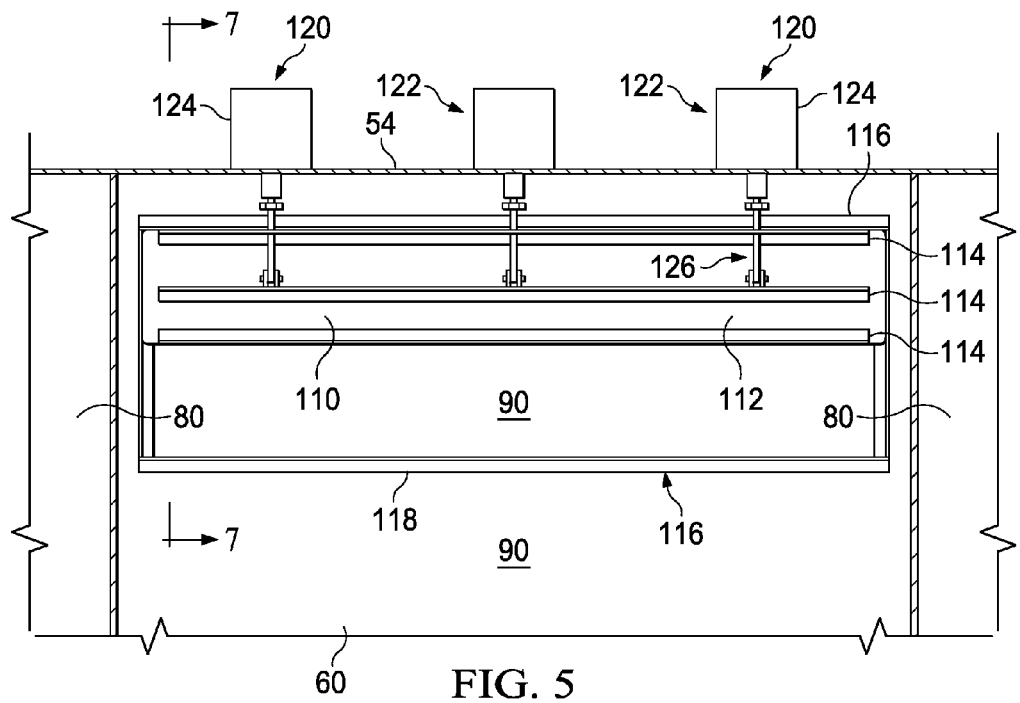
FIG. 5 shows the exemplary vertical wall of FIG. 4 with the exemplary gate in a closed position.
Figure 6:
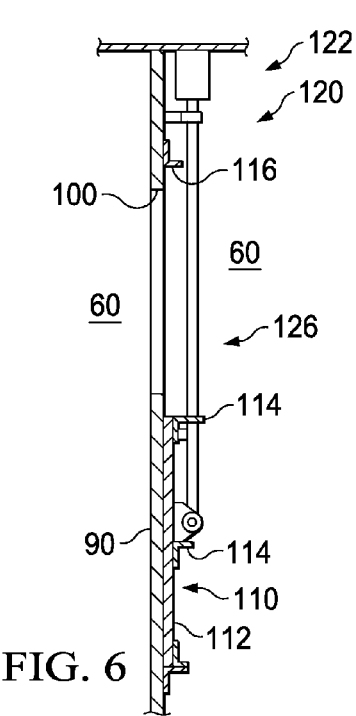
FIG. 6 is a cross-sectional view of part of the exemplary vertical wall and gate of FIG. 4 taken along lines 6-6.
Figure 7:
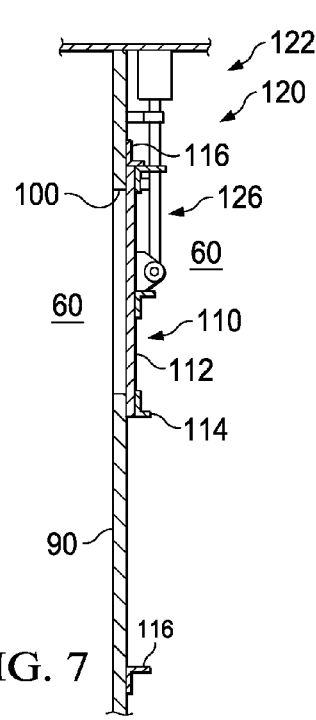
FIG. 7 is a cross-sectional view of part of the exemplary vertical wall and gate of FIG. 5 taken along lines 7-7.

Referring now to FIGS. 3 & 4, each illustrated vertical wall 90 includes at least one fluid passageway, or opening, 100 that allows fluid flow past the associated vertical wall 90. For example, the opening(s) 100 in the front vertical wall 92 allows fluid flow between the body of water 30 and the front cargo compartment 62 (see also FIG. 11), while the openings 100 in each successive vertical wall 90 allow fluid flow between the successive adjacent cargo compartments 60 (see also FIG. 12). In other embodiments, the front vertical wall 92 may instead be coupled to one or more forward-facing trunk (not shown) or other component having at least one fluid passageway that allows fluid flow from the body of water 30, through the associated opening(s) 90 and into the front cargo compartment 62. If desired, two trunks (not shown) fluidly coupled to the compartment 62 may be outwardly angled relative to the longitudinal centerline of the vessel 10. Likewise, the fluid passageways 100 in the other vertical walls 90 may communicate fluid through one or more trunks or other components.

In this particular example, each opening 100 is formed in the corresponding vertical wall 90 proximate to its upper end 94 and the upper end 74 of the adjacent cargo compartment(s) 60. As will be described further below, the location of the openings 100 near the upper end 74 of the cargo compartments 60 may be provided, for example, to encourage primarily oil 34 and some oily water to flow into the front cargo compartment 62 from the body of water 30 and then into each successive cargo compartment 66, 68, 70 72 and 64 during debris recovery operations. It should be noted that to the extent that oil and sea water enter any cargo compartment 60, the lower density of the oil 34 and heavier density of the sea water 38 are expected, to a large extent, to cause the oil 34 to ultimately float atop the sea water 38 therein.

The openings 100 may have any suitable size, configuration and orientation. For example, each vertical wall 90 of the illustrated system 58 includes six square openings 100, each having dimensions of 6 feet high by 15 feet wide and spaced 6 feet from the top of the associated cargo compartment 60. However, there may be more or less openings 100 formed in each vertical wall 90, which may have any other desired dimensions and location.

Figure 2:
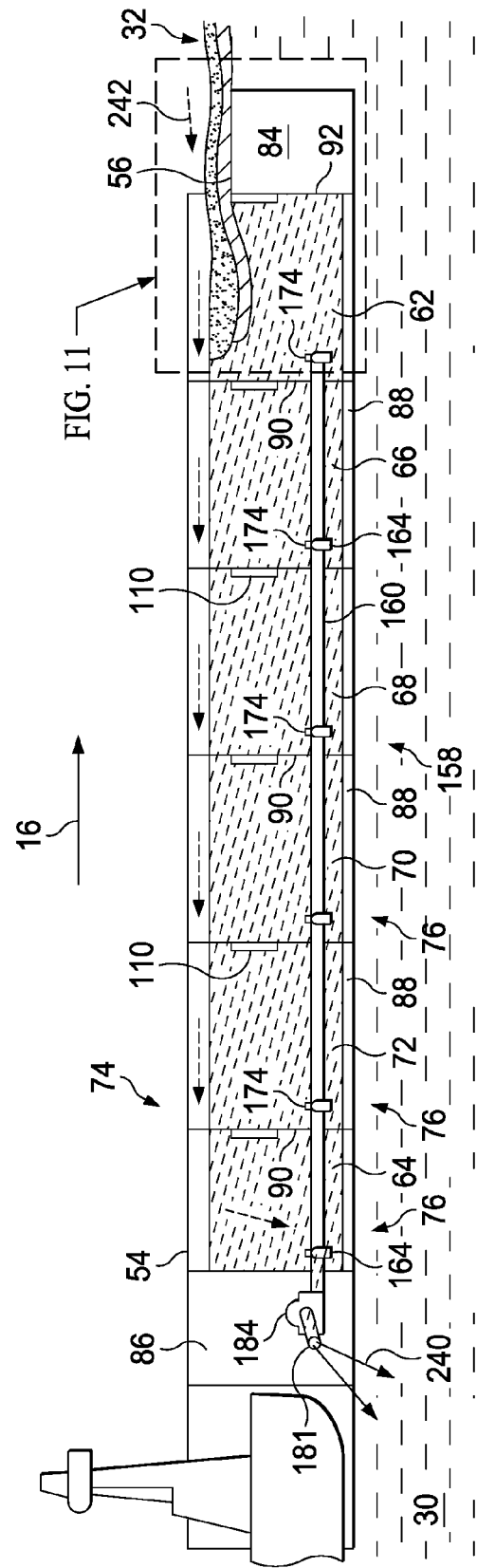
FIG. 2 is a side view of the exemplary vessel of FIG. 1 with the side shell removed to show exemplary interior cargo compartments and other components during exemplary debris recovery operations in accordance with an embodiment of the present disclosure.
Figure 11:
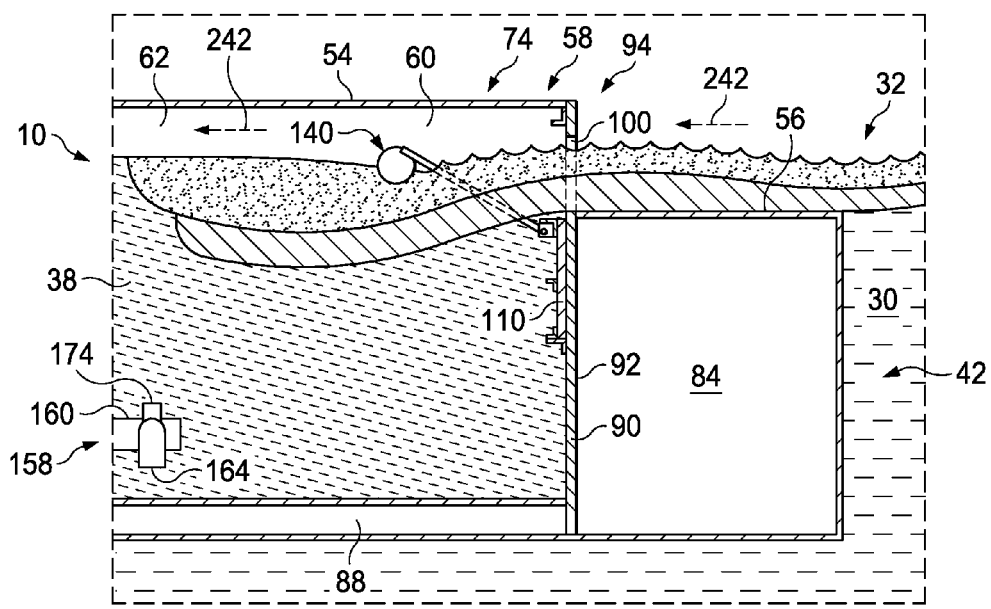
FIG. 11 is an exploded view of part of the exemplary vessel shown in FIG. 2.

Referring to FIGS. 1-3, in the illustrated embodiment, the opening(s) 100 in the front vertical wall 92 allow the flow of liquid into the front cargo compartment 62 from the body of water 30 (see also FIG. 11). The exemplary opening(s) 100 in each successive vertical wall 90 allow liquid to flow at least from the adjacent foremost cargo compartment 60 into the adjacent aft-most cargo compartment 60; or, in other words, into each successive cargo compartment 60 in the aft direction. Thus, in this embodiment, liquid can flow from the body of water 30 into the front cargo compartment 62, then into the second cargo compartment 66, then into the third cargo compartment 68 and so on and finally into the rear-most cargo compartment 64 through the respective openings 100.

Still referring to FIGS. 1-3, if desired, the vessel 10 may have a recessed front deck 56 forward of the front vertical wall 92. As used herein, the term "recessed front deck" and variations thereof refers to the uppermost deck of the vessel 10 that is forward of the front vertical wall 92 and is recessed relative to, or lower in height than, the top deck 54 of at least some of the portion(s) of the vessel 10 that extend over the cargo compartments 60. In this embodiment, as shown in FIG. 3, the recessed front deck 56 aligns below the height of the openings 100 in the front vertical wall 92, such as to assist in encouraging the flow of the top layer(s) of liquid from the body of water 30 into the front cargo compartment 62. However, the recessed front deck 56 may have any other configuration or may not be included.

Still referring to FIGS. 1 & 3, the exemplary system 58 may include at least one distinct door, or gate, 110 arranged and adapted to allow and disallow the flow of fluid through at least one of the openings 100. Each exemplary gate 110 is selectively movable between at least one open and at least one closed position. In the open position(s), each exemplary gate 110 allows liquid flow through its associated opening(s) 100, and in the closed position(s), each illustrated gate 110 disallows liquid flow through its associated opening(s) 100. If desired, the system 58 may be configured so that the gates 110 may be used, at least in part, to further refine the flow of liquid thereby. For example, the position of the respective gates 110 may be remotely adjusted to serve as a skimmer, or oil separator, to encourage mostly oil to waterfall, cascade or pass, by the gate 110 through the associated opening(s) 100. In the present embodiment, the fully open position(s) of each gate 110 is below the associated opening(s) 100. Consequently, if desired, each exemplary gate 110 may be movable up therefrom, or down from a closed position, into one or more partially open position. Thus, in some embodiments, the height of the gate 110 can be adjusted relative to the lower end of the associated opening(s) 100 to cause a waterfall, or cascading, effect of the top layer(s) of liquid (e.g. oil and oily water) and block the lower, heavier, layer of sea water 38 from passing thereby.

It should be noted that, in some embodiments, the gates 110 in the closed position may not provide a complete fluid-tight seal. Thus, when all gates 110 associated with all the openings 100 in one of the vertical walls 90 are in a closed position, the aft-most adjacent cargo compartment 60 is at least substantially sealed from the inflow of liquid from the other adjacent cargo compartment 60, or, in the case of the front cargo compartment 62, from the body of water 30. For example, when the gate(s) 110 associated with opening(s) 100 in the front vertical wall 92 are closed, the front cargo compartment 62 is at least substantially sealed from the entry of liquid from the body of water 30 through those opening(s) 100. As used herein and throughout this patent, the terms "substantial", "substantially", "primarily"

and variations thereof mean generally more than 50% and depending upon the particular components involved and/or circumstances, may be more than 60%, 70%, 80%, 90% and even may be more than 95%. However, in some embodiments, such as upon completion of debris recovery operation and prior to transit of the vessel 10 to an off-loading location, all gates 110 may be 100% sealed.

The gates 110 may have any suitable form, construction, configuration and operation. Referring to FIGS. 4-7, in the illustrated embodiment, a single gate 110 is movable over all the openings 100 formed in the associated vertical wall 90. The exemplary gate 110 includes an elongated plate 112 that is selectively moveable up and down over the adjacent openings 100 between at least one open (e.g. FIGS. 4 & 6) and at least one closed position (e.g. FIGS. 5 & 7) by at least one gate actuator 120. In this embodiment, the gate 110 includes numerous (e.g. three) stiffeners 114 extending at least substantially across the length of the plate 112. The stiffeners 114 may have any suitable form, configuration and construction. For example, the stiffeners 114 may be angle iron coupled to the outside surface of the plate 112, such as to assist in supporting the plate 112 and maintaining the shape of the plate 112 or other desired purpose. However, the present disclosure is not limited to this arrangement. In other embodiments, for example, a distinct gate 110 may be provide for each opening 10, may have a configuration that does not include an elongated plate 112 and/or may not have stiffeners 114.

The gate actuator(s) 120 may have any suitable form, configuration, construction and operation. For example, the gate actuator 120 may be electronically and/or manually and/or remotely controlled. For another example, one or more gate actuators 120 may be used to control movement of one or more gates 110. For yet another example, the gate actuator 120 may be used to selectively move the associated gate(s) 110 between positions, such as between any among multiple different open positions and a closed position, based upon any suitable criteria. For example, any one or more of the gates 110 may be moved to an optimal partially-open position for encouraging mostly oil to flow thereby based upon the particular density, thickness and/or weight of the oil. Thus, the gate actuator(s) 120 may, if desired, be configured so that the position of one or more of the gates 110 may be varied throughout debris recovery operations.

Figure 8:
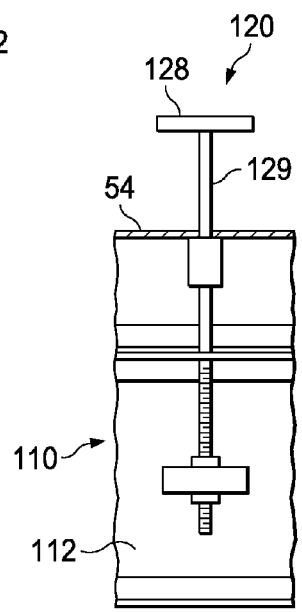
FIG. 8 is a front view of part of an exemplary gate of the present disclosure showing an alternate embodiment of a gate actuator.

Still referring to FIGS. 4-7, in this embodiment, three gate actuators 120 are used to drive each exemplary gate 110. Each illustrated gate actuator 120 is a hydraulic actuator 122, as is and become further known. For example, the hydraulic actuator 122 may include a hydraulic power unit 124 (shown positioned above the top deck 54) which drives a telescoping unit 126 coupled to the gate 110. In other embodiments, the gate actuator 120 may be a pneumatic actuator, as is and become further known. In the embodiment of FIG. 8, the gate actuator 120 includes a manually rotatable crank-wheel 128 and crank rod 129 coupled to the gate 110 and configured to move the gate 110 up into at least one closed position and down into one or more open positions. If desired, the crank-wheel 128 may extend above the top deck 54, such as for convenience.

Referring specifically to FIG. 4, if desired, one or more gate guide/sealing mechanisms 116 may be provided, such as to assist in defining one or more position of the gate 110, guiding the up and down movement of the gate 110, enhancing the desired sealing engagement between the gate 110 and vertical wall 90, or any other purpose. The gate guide/sealing mechanism 116 may have any suitable form, configuration, construction and operation. In the illustrated embodiment, the gate guide/sealing mechanism 116 includes a frame 118 extending around the periphery of all of the openings 100 to define the upper and lower limits of movement of the gate 110 and also assist in providing some sealing engagement between the gate 110 in a fully closed position and the vertical wall 90. For example, the frame 118 may be constructed of angle iron coupled to the vertical wall 90.

Figure 10:
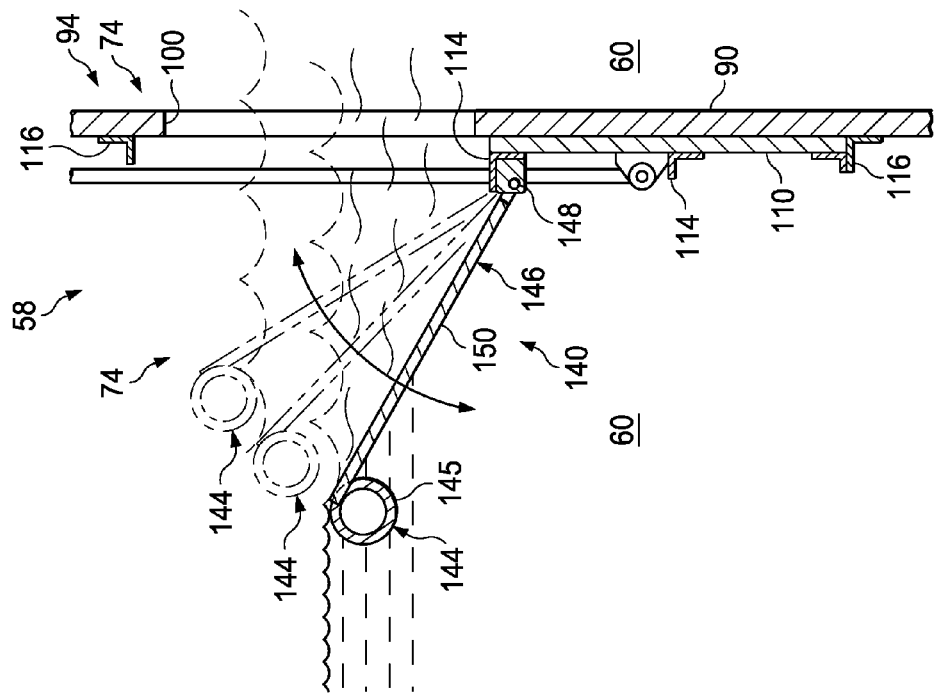
FIG. 10 is a side, cross-sectional view of the exemplary wave dampener of FIG. 9 taken along lines 10-10.
Figure 9:
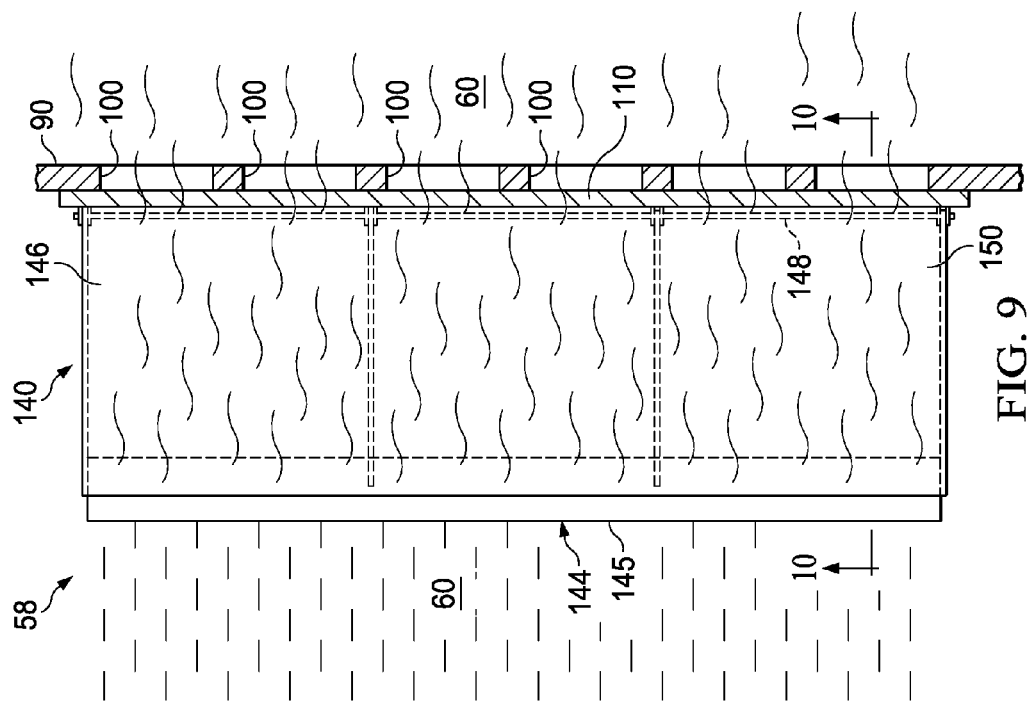
FIG. 9 is a top view of an exemplary wave dampener within an exemplary cargo compartment of the vessel of FIG. 1 in accordance with an embodiment of the present disclosure.

Now referring to FIGS. 9 & 10, if desired, the debris recovery system 58 may include one or more wave dampeners 140 within one or more of the cargo compartments 60. The wave dampener(s) 140 may have any suitable purpose. For example, the wave dampener(s) 140 may be provided to reduce the size of, or turbulence caused by, waves in the liquid passing through one or more of the openings 100, help encourage only the top layers of liquid (e.g. oil, oily water) to pass through the openings 100, and/or help maintain a steady flow of liquid through the openings 100.

The wave dampeners 140 may have any suitable form, configuration, construction and operation. In this embodiment, a wave dampener 140 extends into each cargo compartment 60 proximate to the opening(s) 100 formed in the forward-most vertical wall 90 for that cargo compartment 60 (See also FIGS. 11 & 13). The illustrated wave dampener 140 includes at least one elongated float 144 spaced-away from the vertical wall 90 and arranged to float in the liquid entering the cargo compartment 60 though the openings 100. The exemplary elongated float 144 is configured to freely move up and down with the surface of the liquid. In FIG. 10, for example, the elongated float 144 is shown in three positions as it moves up and down with the incoming liquid.

In this particular embodiment, the elongated float 144 is a single tube 145 (e.g. hollow-pipe) coupled (e.g. by weld, mechanical connectors, etc.) to the end of one or more carrier 146. The illustrated carrier 146 is pivotably connected to the gate 110 associated with the openings 100, such as with one or more hinge pin 148. The exemplary carrier 146 and elongated float 144 extend across all of the openings 100 in the vertical wall 90. Depending upon the particular circumstances and arrangement, the carrier 146 may also assist in reducing the size of, or turbulence caused by, waves in the liquid passing through one or more of the openings 100, encouraging only the top layer(s) of liquid (e.g. oil, oily water) to pass through the openings 100, and/or maintaining a steady flow of liquid through the openings 100. In this embodiment, the exemplary carrier 146 is a flat plate 150. When included, the carrier 146 and float 144 may be constructed of metal, plastic or any other suitable material or combination thereof. In other embodiments, the wave dampener 140 may include multiple elongated floats 144 and/or carriers 146. Further, the wave dampener 140 may instead be coupled to the vertical wall 90 or other component(s).

Figure 13:
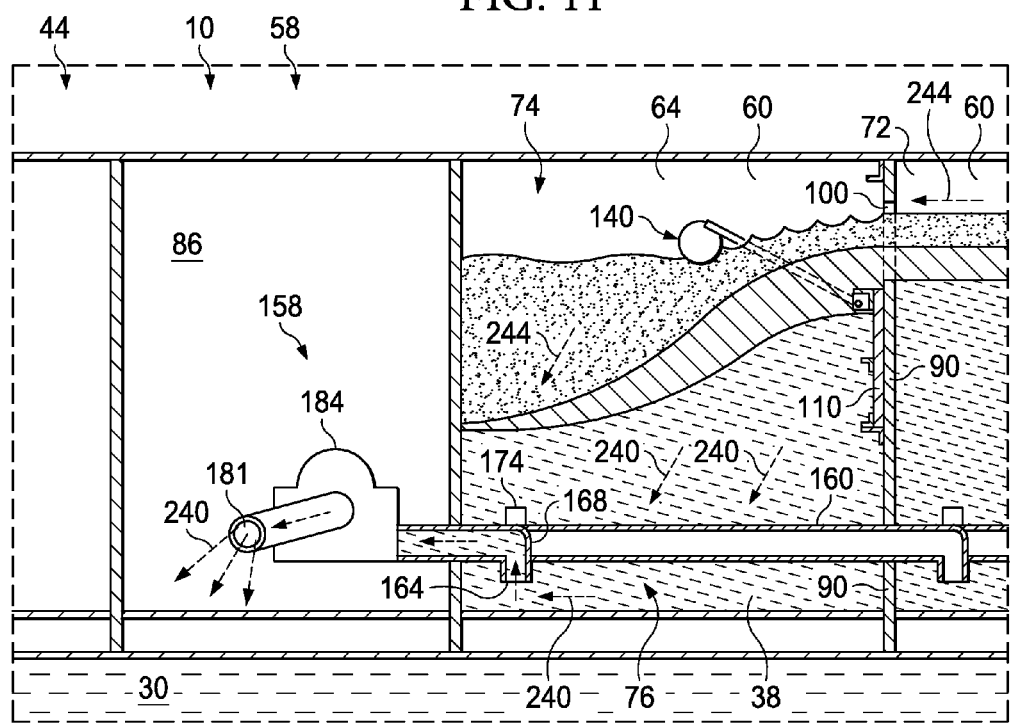
FIG. 13 is an exploded view of part of the exemplary vessel shown in FIG. 12.
Figure 12:
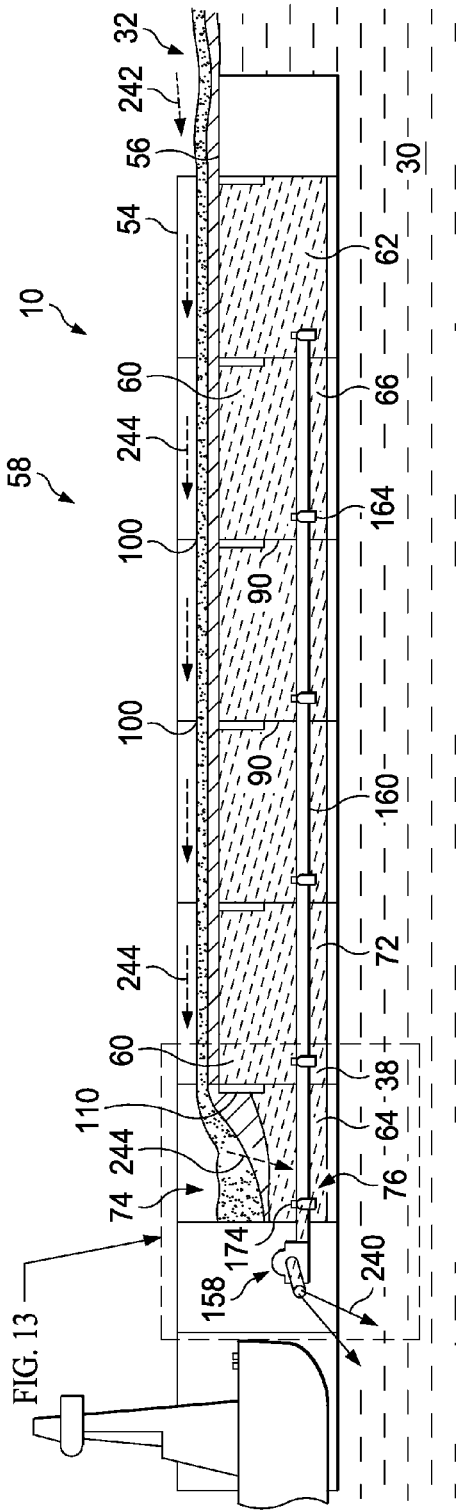
FIG. 12 is a side view of the exemplary vessel of FIG. 1 with the side shell removed to show exemplary interior cargo compartments and other components during exemplary debris recovery operations in accordance with an embodiment of the present disclosure.

Referring back to FIGS. 1 & 2, the exemplary debris recovery system 58 may include a fluid removal system 158 configured to allow fluid to be selectively removed from each cargo compartment 60. In other words, fluid can be removed through the fluid removal system 158 from any one or more cargo compartment 60 at the same time, or in isolation relative to the other cargo compartments. Referring specifically to FIGS. 12 & 13, in the present embodiment, the fluid removal system 158 is particularly configured to allow the drainage of sea water 38 from the lower end 76 of any cargo compartment 60 and, at the same time, ultimately allow oil to at least partially fill that cargo compartment 60 from its upper end 74 through the opening(s) 100 in the forward-adjacent vertical wall 90. In fact, the illustrated system 58 allows each successive cargo compartment 60, starting at the rear end 44 of the vessel 10, to be at least substantially drained of sea water 38 and, concurrently, at least partially or substantially filled with oil 34.

The fluid removal system 158 may include any suitable components and operation. In the illustrated embodiment, as shown in FIG. 1, the system 158 includes a main suction conduit 160 extending at least partially through, and fluidly coupled to, each cargo compartment 60 and configured to remove liquid from each cargo compartment 60 as described above. The suction conduit 160 may have any suitable form, configuration, construction, location and operation. The exemplary suction conduit 160 extends lengthwise from the front cargo compartment 62 to aft of the rear cargo compartment 64, and delivers the drained liquid into the body of water 30 proximate to its aft end. However, any other desired configurations may be utilized. For example, the system 158 may include multiple main suctions conduits 160. For another example, the suction conduit(s) 160 may not extend lengthwise through all the cargo compartments 60 and/or may discharge liquid at one or more intermediate location on the vessel 10. For still a further example, the suction conduit(s) 160 may deliver the drained liquid to any other desired destination (e.g. into another one or more compartments and/or other container(s) on the vessel 10, or to another vessel, such as via one or more hose, etc.).

Figure 19:
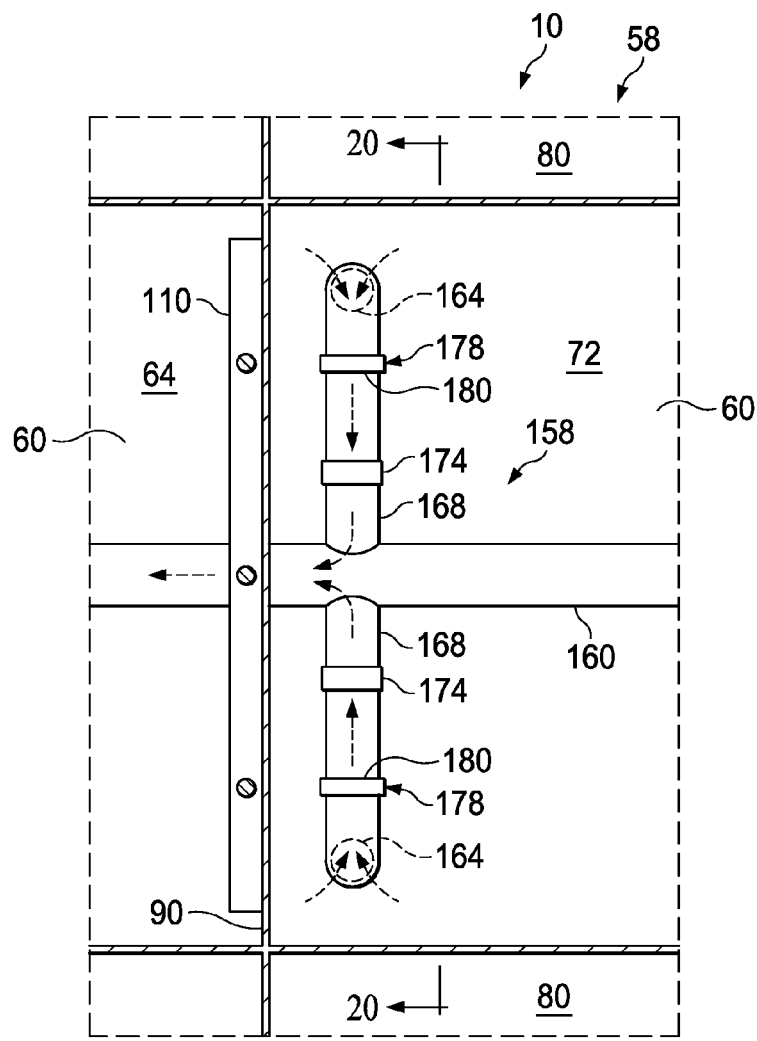
FIG. 19 is an exploded top view of part of the exemplary fluid removal system shown in FIG. 1.
Figure 20:
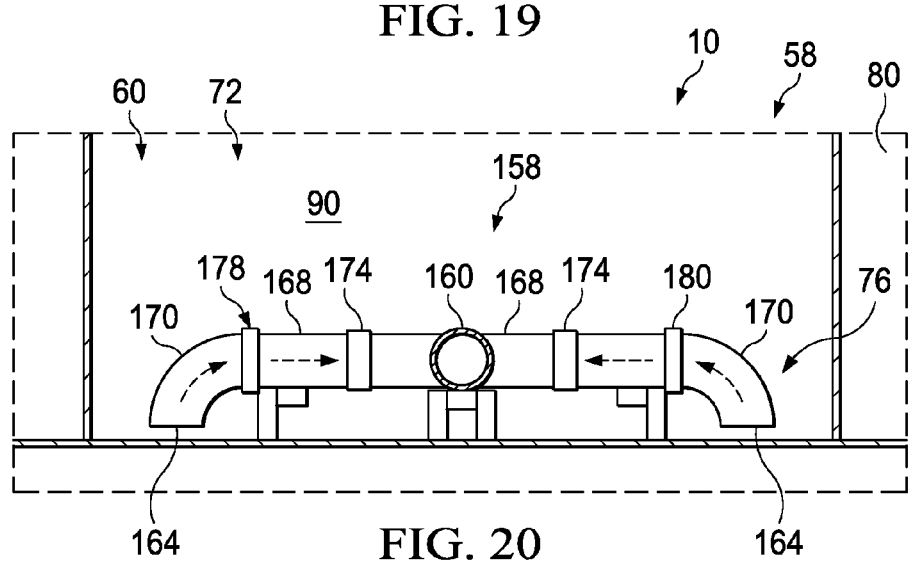
FIG. 20 is a front view of some of the exemplary fluid removal system components in FIG. 19 taken along lines 20-20.

Referring now to FIGS. 19 & 20, the exemplary suction conduit 160 is configured to draw liquid from each cargo compartment 60 at the lower end 76 thereof. For example, the illustrated suction conduit 160 can draw liquid through at least one distinct suction inlet 164 positioned within each respective cargo compartment 60 proximate to the lower end 76 thereof (See also e.g. FIG. 13). In this embodiment, the fluid removal system 158 includes two suction inlets 164 disposed within each cargo compartment 60. The exemplary suction inlets 164 are each provided in a respective inlet pipe section 168 fluidly coupled to and extending laterally from the suction conduit 160. The illustrated suction inlets 164 are positioned to optimally draw in liquid (e.g. sea water) from the bottom of the cargo compartment 60. For example, the inlets 164 may be positioned as close to the bottom (lower end 76) of the associated cargo compartment 60 as is possible or practical. In this embodiment, each suction inlet 164 is the open end of a downwardly facing elbow pipe 170 provided at the ends of the respective inlet pipe sections 168. However, this exemplary configuration is not limiting upon the present disclosure. Any other suitable arrangement may be used to remove fluid (e.g. sea water) from one or more cargo compartments 60.

The size, number and location of the suction inlets 164 may be determined based on any suitable criteria, such as to provide the desired liquid flow rate in the associated cargo compartment 60. For example, the velocity of the liquid (e.g. sea water) being removed from the cargo compartments 60 may be determined or limited to control or limit the turbulence and mixing of the liquid (e.g. oil, oily water) entering the successive compartments 60 through the associated openings 100 and promote the separation of oil and sea water in the cargo compartments 60.

Still referring to FIGS. 19 & 20, the fluid removal system 158 may be configured to fluidly isolate each cargo compartment 60 in any suitable manner. For example, at least one fluid valve 174 may be associated with each cargo compartment 60. In the present embodiment, in an open position, each such valve 174 will allow the flow of liquid from the associated cargo compartment 60 into the suction conduit(s) 160 at the location of that valve 174. In a closed position, each exemplary valve 174 will disallow liquid flow between the associated cargo compartment 60 and the suction conduit 160 at the location of that valve 174. Any suitable arrangement of valves 174 may be used for selectively allowing and disallowing liquid flow from each cargo compartment 60 into the fluid removal system 158. In this embodiment, a distinct selectively controllable valve 174 is provided between the suction conduit 160 and each suction inlet 164, such as in each inlet pipe section 168. Thus, to remove liquid from a particular cargo compartment 60, the exemplary valves 174 in that cargo compartment 60 are opened and the valves 174 in all other cargo compartments 60 are closed. In some embodiments, it may be possible to open one or more valves 174 in multiple cargo compartments 60 at the same time.

The valve(s) 174 may have any suitable form, configuration and operation. For example, the valves 174 may be the presently commercially available Class 123, iron body, gate-type valves having an outside screw and yoke with a rising stem by Crane Co. If desired, the valves 174 may be remotely actuated, such as via an electronic controller or computer-based control system, as is and becomes further known.

Still referring to FIGS. 19 & 20, if desired, the fluid removal system 158 may include one or more debris sensor 178 to determine when the debris being recovered from the body of water 30 is approaching or entering the fluid removal system 158. For example, the debris sensor(s) 178 may be mounted in the cargo compartment 60 or coupled to the fluid removal system 158. The debris sensor 178 may have any suitable form, configuration and operation. In this embodiment, the debris sensor 178 is an oily water sensor 180 disposed within each cargo compartment 60 proximate to each suction inlet 164 and configured to detect oil in the liquid entering the associated section inlet 164. For example, a distinct oily water sensor 180 may be fluidly coupled to each inlet pipe section 168 or the suction conduit 160. The illustrated oily water sensor 180 may, for example, be the presently commercially available Model EX-100P2/1000P2, in-line analyzer by Advanced Sensors. For another example, at least one oily water sensor may be mounted elsewhere in the cargo compartment 60. An example of a presently commercially available oily water sensor 180 that may be mounted elsewhere in the cargo compartment 60 is the Model EX-100M/1000M side stream analyzer by Advanced Sensors. If desired, the system 58 may be configured so that each sensor 178 may communicate with an electronic controller or computer-based control system, such as to provide control signals to the sensor 178 and/or for the sensor 178 to provide signals when the debris (e.g. oil) is detected in the sea water entering the associated suction inlet 164.

Referring back to FIG. 1, the fluid removal system 158 may deliver the fluid removed from the cargo compartments 60 to one or more desired destination in any suitable manner. In this embodiment, the suction conduit 160 discharges liquid from the cargo compartments 60 into the body of water 30 via at least one discharge opening 181 disposed aft of the rear cargo compartment 64. For example, the discharge opening 181 may be disposed on one or the other side 46, 48 of the vessel 10 and fluidly communicate with the suction conduit 160 via one or more discharge pipe sections 182. In the illustrated embodiment, at least one discharge pipe section 182 extends laterally from each side of the suction conduit 160 toward a distinct discharge opening 181 on the left or right side 46, 48 of the vessel 10, respectively.

If desired, the fluid removal system 158 may include one or more discharge pumps 184 configured to assist in drawing fluid (e.g. sea water) from one or more cargo compartments 60 into the suction conduit 160 and discharge it from the debris recovery system 158. For example, the discharge pump(s) 184 may provide "active" removal of fluid from the cargo compartments 60, such as to expedite the debris recovery operation, eliminate the need to continuously move the vessel 10 through the debris field 36 during debris recovery operations or other purpose.

The discharge pump 184 may have any suitable form, configuration, location, operation and purpose. In this embodiment, a distinct discharge pump 184 is fluidly coupled to the discharge pipe section(s) 182 on each side of the suction conduit 160 and configured to create suction in the system 158 to draw liquid from one or more cargo compartments 60, through the suction conduit 160 and out the associated discharge opening 181. In other embodiments, one or more banks of multiple discharge pumps 184 (e.g. 2 banks of 5 or 6 pumps each) may be provided, such as to enhance the ability to control fluid removal during debris recovery operations, provide greater flexibility in fluid removal, reduce the potential for negative consequences caused by pump failure during operations, one or more other purposes, or a combination thereof. The illustrated discharge pump 184 may be any suitable pump capable of providing sufficient suction on one of its sides to draw liquid from one or more cargo compartments 60 into the suction conduit 160 and discharge the fluid through the associated discharge opening(s) 181. For example, the discharge pump 184 may be a presently commercially available Model 3498 double suction pump by Goulds Pumps. However, some embodiments may not include any discharge pumps 184.

Still referring to FIG. 1, if desired, the fluid removal system 158 may include one or more fluid valves 188 to seal off the suction conduit 160 and/or or other components of the system 158. The valve(s) 188 may have any suitable form, configuration, location and operation and purpose. In the present embodiment, one or more valves 188 are provided proximate to each discharge opening 181 to seal off the aft end of the suction conduit 160 and related components from the body of water 30 when the system 158 is not in operation, during transit and/or after the cargo compartments 60 have been at least partially filled with oil and oily water. For example, a valve 188 is shown fluidly coupled to the discharge pipe section 182 between each discharge opening 181 and adjacent discharge pump 184. Any suitable type of fluid valve 188 may be used, such as the presently commercially available Class 123, iron body, gate-type valves having an outside screw and yoke with a rising stem by Crane Co. If desired, the valves 188 may be remotely actuated, such as via an electronic controller or computer-based control system, as is and becomes further known.

Still referring to the embodiment of FIG. 1, the debris recovery system 58 may include at least one at least partially floating, elongated, boom 190 disposed proximate to the front end 42 of the vessel 10. In some embodiments, the boom(s) 190 may be useful, for example, to encourage liquid to flow into the front cargo compartment 62 from the body of water 30 and, in particular, to ultimately effectively funnel, or corral, the top layer(s) of liquid, namely oil and oily water, for entry into the cargo compartment 62. Any desired number, type, configuration and construction of booms 190 may be included, and the boom(s) 190 may have any suitable location and operation. In the illustrated embodiment, the debris recovery system 58 includes first and second elongated booms 192, 194 configured to be movable between at least one stowed position and at least one deployed position. In the stowed position, the exemplary booms 192, 194 are positioned adjacent to the front end 42 of the vessel 10, such as shown in shadow in FIG. 1. In other embodiments, the boom(s) 190 in the stowed position may be positioned at least partially on the front end 42 of the vessel 10, such as atop the recessed front deck 56.

In at least one deployed position, the exemplary booms 190 extend angularly outwardly from the vessel 10 away from the front end 42, the first elongated boom 192 being closer to the left side 46 of the vessel 10 and the second elongated boom 194 being closer to the right side 48 of the vessel 10. In some embodiments, for example, the booms 192, 194 may extend out into the body of water at an approximate 45 degree angle relative to the longitudinal centerline of the vessel 10. In this embodiment, the deployed positions of the booms 190 are useful to form an overall funnel shape forward of the vessel 10 to allow or encourage liquid, particularly oil, to flow or funnel into the front cargo compartment 62 during debris recovery operations. If desired, one or more cables or other connectors may be coupled between each boom 190 and the vessel 10, such as to provide support for the boom 190 in the deployed position(s), maintain the position of the boom 190 in the deployed position, prevent the boom 190 from moving back towards the vessel 10 from the deployed position or other suitable purpose. For example, multiple cables or other connectors may extend between the vessel 10 and each boom 190 at different locations along the length of the boom 190.

Figure 21:
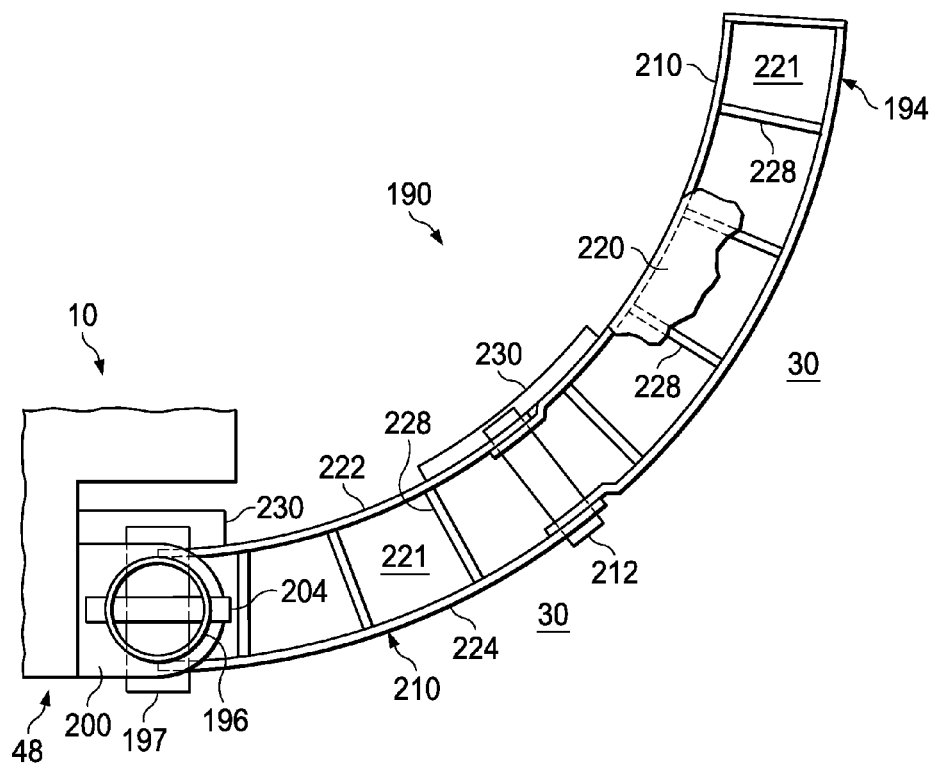
FIG. 21 is a top view of an exemplary elongated boom of FIG. 1 shown in a stowed position.
Figure 22:
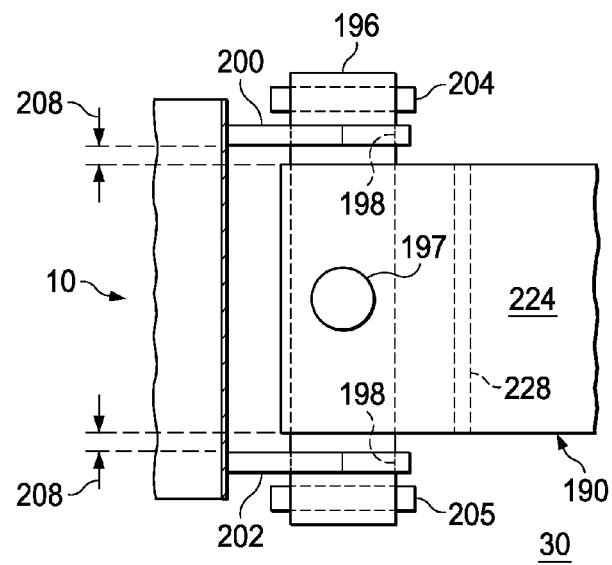
FIG. 22 is an exploded view of part of the exemplary elongated boom of FIG. 21.

The elongated boom(s) 190 may be movable between at least one stowed and at least one deployed position in any suitable manner. Referring to FIGS. 21 & 22, in this embodiment, each boom 190 is pivotably engaged with the vessel 10. For example, the boom 190 may be secured to a vertical pipe, or pin, 196, such as with one or more cross pin 197 extending transversely through the boom 190 and vertical pipe 196. The illustrated cross pin 197 allows the concurrent movement of the boom 190 and vertical pin 196. The exemplary vertical pin 196 is rotatable within holes 198 formed in at least one upper bracket 200 and at least one lower bracket 202 extending from, or coupled to, the vessel 10. The vertical pin 196 may be prevented from sliding out of the holes 198 in any suitable manner, such as with upper and lower locking pins 204, 206 extending transversely through the vertical pin 196 above and below the upper and lower brackets 200, 202, respectively. However, the present disclosure is not limited to this arrangement for moving the elongated boom(s) 190 between at least one stowed and at least one deployed position. For example, in some embodiments, one or more hydraulic or pneumatic actuators, cables, winches or other known components may be used to move booms 190 between stowed and deployed positions.

If desired, the boom 190 may be configured to be moveable into and secured in more than one distinct deployed position. This may be desirable, for example, to form a wider or narrow outer reach of multiple booms 190, or any other purpose. Any suitable mechanism(s) may be used to provide multiple distinct deployed positions of the boom(s) 190. For example, the vertical pin 196 may be engaged with a ratchet-like mechanism to secure the boom 190 in multiple deployed positions. If desired, the movement of the boom(s) 190 between at least one stowed and at least one deployed position may be automated and/or automatically controlled, such as with an electronic controller or computer-based control system, as is and becomes further known.

Still referring to FIGS. 21 & 22, each exemplary elongated boom 190 may be movable vertically relative to the vessel 10 during operations and/or include multiple articulating boom sections 210 to allow the boom 190 to follow or respond to the action of waves in body of water 30, reduce the potentially damaging forces places upon the boom 190 and/or connecting components (e.g. vertical pin 196, locking pins 204, 206, brackets 200, 202) during extreme or near extreme sea conditions, maintain a desired position of the boom 190 in the body of water 30 or any other suitable purpose. These features may be useful, for example, to enhance the flexibility and capabilities of the vessel 10 and debris recovery system 58 to operate in typical deep sea conditions and not have to wait for the debris field to move close to shore.

Each boom 190 may be vertically moveable relative to the vessel 10 in any suitable manner. For example, the vertical pin 196 may be movable up and down relative to the upper and lower brackets 200, 202 within a desired range of motion. In this embodiment, the vertical pin 196 is movable up and down relative to the upper and lower brackets 200, 202 a desired distance 208. For example, if the distance 208 is 3 feet, the boom 190 and connected vertical pin 196 may move up to three 3 feet up and down relative to the brackets 200, 202 and vessel 10.

Still referring to FIGS. 21 & 22, each exemplary boom 190 includes multiple, interconnected, articulating boom sections 210 that are moveable relative to one another during debris recovery operations. While the illustrated embodiment includes two articulating boom sections 210, other embodiments may include three, four, five, size or more boom sections 210. The boom sections 210 being moveable relative to one another in any suitable manner. For example, the illustrated boom sections 210 are pivotably coupled together to allow each of them to move up and down relative to one other when the boom 190 is in one or more deployed positions. In this embodiment, adjacent boom sections 110 are connected with at least one hinge pin 212 extending transversely between them and allowing their relative up and down movement. In other embodiments, the boom sections 210 may be also or instead moveable side to side relative to one another.

Still referring to the embodiment of FIGS. 21 & 22, each elongated boom 190 may have an overall curved, straight or varied-shaped outer profile. The exemplary boom 190 is formed in a hollow box-beam configuration with one or more top plate 220, bottom plate 221, inner side plate 222, outer side plate 224 and end cap plate 226. If desired, one or more stiffener plates 228 may be provided within the boom 190, such as to add stiffness and structural support to the boom 190. The exemplary stiffener plates 228 are shown extending between the side plates 222, 224, but could also or instead be provided between the top and bottom plates 221 or oriented in a different configuration. The exemplary plates 220, 221, 222 and 224 and stiffener plates 228 are constructed of any suitable material, such as steel. However, the boom 190 may have any other suitable construction.

If desired, one or more flexible, fluidly impermeable cover 230 may be coupled to the boom 190 over the cross pin 197 and/or hinge pin(s) 212. This may be useful in some embodiments, for example, to prevent liquid, and particularly oil, from escaping from inside the funnel area caused by the boom (s) 190 through the boom 190 at the location of the cross pin 197 and hinge pin(s) 212. The flexible cover 230 may have any suitable form, configuration, construction and operation. For example, the flexible covers 230 may be flaps, sheets or other arrangements of heavy, flexible neoprene rubber. In this embodiment, each flexible cover 230 is coupled to the boom 190 only on one side of the respective cross pin 197 or hinge pin 212 to allow the remainder of the cover 230 to slide relative to the boom 190 during shifting or movement of the boom 190 or articulating section(s) 210 during operations. For example, the cover 230 disposed over the cross pin 197 may be coupled to the boom 190 forward of the cross pin 197, and the cover 230 disposed over each hinge pin 212 may be coupled to the adjacent boom section 210 forward of the hinge pin 212. In other embodiments, the cover 230 may instead be coupled to the boom 190 or other component on both respective sides of the cross pin 197 and/or hinge pins 212. For example, the cover 230 may have a pleated, or accordion-like, configuration and be coupled to both sides of the boom 190 or boom sections 210 so that it gives, or bends along with the boom 190 and/or boom sections 210.

Referring back to FIGS. 1 & 3, in some embodiments, the vessel 10 may be arranged and ballasted so that its front end 42 and the boom(s) 190 are at least partially submerged in sea water during debris recovery operations. In some circumstances, this may be beneficial to provide the desired rate and/or flow of liquid into the cargo compartments 60, encourage the top layer of liquid (e.g. oil) to enter the cargo compartments 60 from the body of water 30 or other desired purpose. In the present embodiment, the vessel 10 may be configured so that when the vessel 10 is submerged to its load line, the recessed front deck 56 is at least partially submerged and the booms 192, 194 and openings 100 in the front vertical wall 92 are partially submerged so that the top layer(s) on the surface 32 of the body of water 30 can wash across the recessed front deck 56 and flow directly into those openings 100. For example, the vessel 10 may be arranged and ballasted so that the booms 190 and the openings 100 in the front vertical wall 92 are submerged up to approximately ½ their respective heights. Thus, if the booms 190 and the openings 100 in the front vertical wall 92 each have a height of 6 feet, for example, the vessel 10 may be positioned in the body of water so the boom 190 and openings 100 are each submerged 3 feet. However, any other desired arrangement may be used.

An exemplary method of removing debris from a body of water 30 in accordance with an embodiment of the present disclosure will now be described. Referring initially to the embodiment of FIGS. 1 & 2, the cargo compartments 60 of the debris recovery vessel 10 are initially at least substantially filled with water in any suitable manner. If desired, the cargo compartments 60 may be flooded with sea water 38 before the vessel reaches the oil spill area 36. For example, all the gates 110 could be moved into a fully open position to allow the cargo compartments 60 to free flood with sea water 38. Also if desired, the free flooding of the cargo compartments 60 could be performed during the forward movement of the vessel 10 in the direction of arrow 16 (FIG. 2), such as to flood, or assist in expediting flooding of, the compartments 60. Preferably, the illustrated valves 174 are closed during free flooding of the cargo compartments 60. However, it may be possible to temporarily open the valves 174 and even turn on one or more discharge pump 184 to fill the compartments 60 with sea water. The vessel 10 may be arranged and ballasted so that flooding the cargo compartments 60 will submerge the vessel 10 to the desired load line, such as described above.

After the exemplary cargo compartments 60 are at least substantially filled with water, the vessel 10 is moved to the oil spill area 36. Preferably at that time, each illustrated boom 190 is moved to a deployed position, such as described above. However, the boom(s) 190 may be moved into a deployed position at an earlier or later time. Once at the oil spill area 36, while all of the exemplary gates 110 are in an open position, sea water is removed from the rear cargo compartment 64. For example, one or more of the valves 188 are opened and all of the valves 174, except those in the rear cargo compartment 64, are closed. The exemplary valves 174 in the rear cargo compartment 64 are opened to remove sea water from the lower end 76 of the rear cargo compartment 64 into the suction conduit 160 and out one or more discharge opening 181 in the path of arrows 240 (FIG. 2). If desired, one or more discharge pump 184 may be turned on, such as to provide active suction and pumping of the sea water.

Still referring to the embodiment of FIG. 2, as sea water is removed from the lower end 76 of the rear cargo compartment 64, liquid is simultaneously drawn into or enters the front cargo compartment 62 through the openings 100 in the front vertical wall 92. Although it is impossible to forecast the actual makeup of the liquid entering those openings 100 at any specific point in time, the exemplary debris recovery system 58 is configured so that primarily the liquid on and near the surface 32 of the body of water 30 (e.g. oil and some oily water) enter the front cargo compartment 62, as shown by flow arrow 242 in FIGS. 2 & 11.

In accordance with this embodiment, since the intermediate cargo compartments 66, 68, 70 and 72 are substantially full of sea water, as the lower end 76 of the rear cargo compartment 64 is being emptied of sea water, the upper layers of liquid (e.g. oil and some oily water) entering the front cargo compartment 62 are preferably drawn across the surface of the sea water in the intermediate cargo compartments 66, 68, 70 and 72 through the openings 100 in each successive vertical wall 90 and ultimately into the rear cargo compartment 64, such as shown with flow arrows 244 in FIG. 12. If one or more exemplary wave dampeners 140 (e.g. FIGS. 11 & 13) are included in one or more of the cargo compartments 60, the wave dampener(s) 140 may assist in encouraging primarily oil and some oily water to enter the front and subsequent cargo compartments 62, 66, 68, 72 and 64 through the successive openings 100, reduce wave action and turbulence of liquid entering each compartment 60, help maintain a steady flow of liquid through the openings 100 or other desired purpose. In this embodiment, as sea water continues to be drawn down through the rear cargo compartment 64, it is expected that at least some of the oil in the oily water therein will separate and float on top of the sea water, further separating the oil from the sea water therein.

Figure 14:
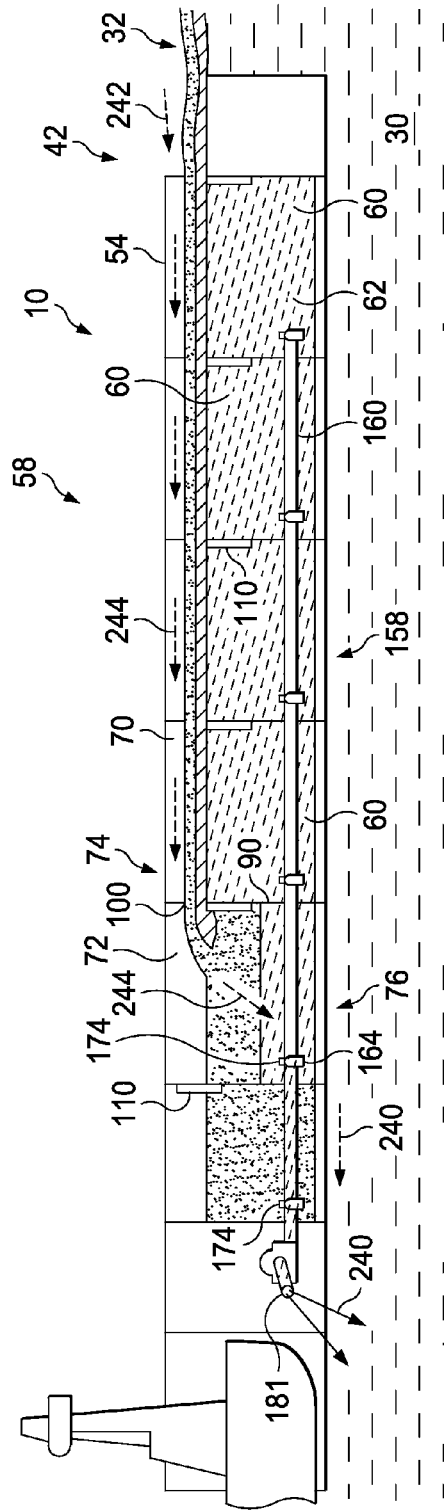
FIG. 14 is a side view of the exemplary vessel of FIG. 1 with the side shell removed to show exemplary interior cargo compartments and other components during exemplary debris recovery operations in accordance with an embodiment of the present disclosure.

Referring now to the embodiment of FIGS. 12 & 14, when substantially all of the sea water in the exemplary rear cargo compartment 64 is removed, that compartment 64 is fluidly isolated as desired. For example, the compartment 64 may be fluidly isolated from the fluid removal system 158 and the other compartments 60, such as by closing the valves 174 in the cargo compartment 64 and the gate(s) 110 associated with the openings 100 that lead into that compartment 64. In some embodiments, the cargo compartment 64 may be fluidly isolated when it is substantially full of oil. For example, this may occur when one or more debris sensors 178, such as the oily water sensors 180 (e.g. FIG. 20), indicate the presence of some or a particular amount of oil in the exiting sea water.

In this embodiment, to continue the debris recovery operations, the above process as performed with respect to the rear cargo compartment 64 is repeated for each successive aft-most cargo compartment 60. For example, referring to FIG. 14, the valve(s) 174 in the next cargo compartment 72 are opened to allow sea water to be removed from the lower end 76 of that compartment 72 in the path of arrows 240. Substantially simultaneously, principally oil and some oily water preferably enters into the upper end 74 of, and fills, that cargo compartment 72, such as shown with flow arrows 244. In this embodiment, when substantially all sea water in that cargo compartment 72 is removed (e.g. FIG. 15), that compartment 72 is fluidly isolated. For example, the compartment 72 may be fluidly isolated at least from the remaining forward cargo compartments 60 which still contain sea water, or fluidly isolated similarly as described above with respect to cargo compartment 64. For example, the valves 174 in that cargo compartment 72 and the gate(s) 110 associated with the openings 100 that lead into that compartment 72 may be closed.

If desired, the above exemplary process may then be repeated for cargo compartment 70 (e.g. FIGS. 15 & 16) by opening the valves 174 therein to allow sea water to be removed from the lower end 76 of that compartment 70 in the path of arrows 240. In this embodiment, substantially simultaneously, principally oil and some oily water preferably enters into the upper end 74 of, and fills, that cargo compartment 70, such as shown with flow arrows 244 (FIG. 15). When substantially all sea water in that cargo compartment 70 is removed (FIG. 16), it may be fluidly isolated, such as described above.

Figure 17:
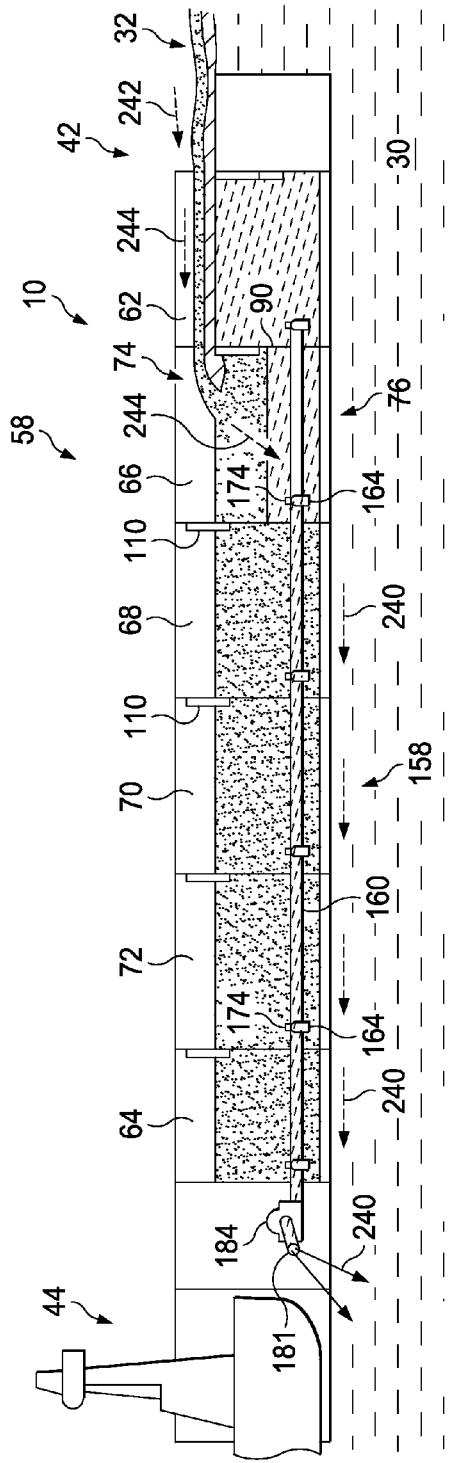
FIG. 17 is a side view of the exemplary vessel of FIG. 1 with the side shell removed to show exemplary interior cargo compartments and other components during exemplary debris recovery operations in accordance with an embodiment of the present disclosure.
Figure 18:
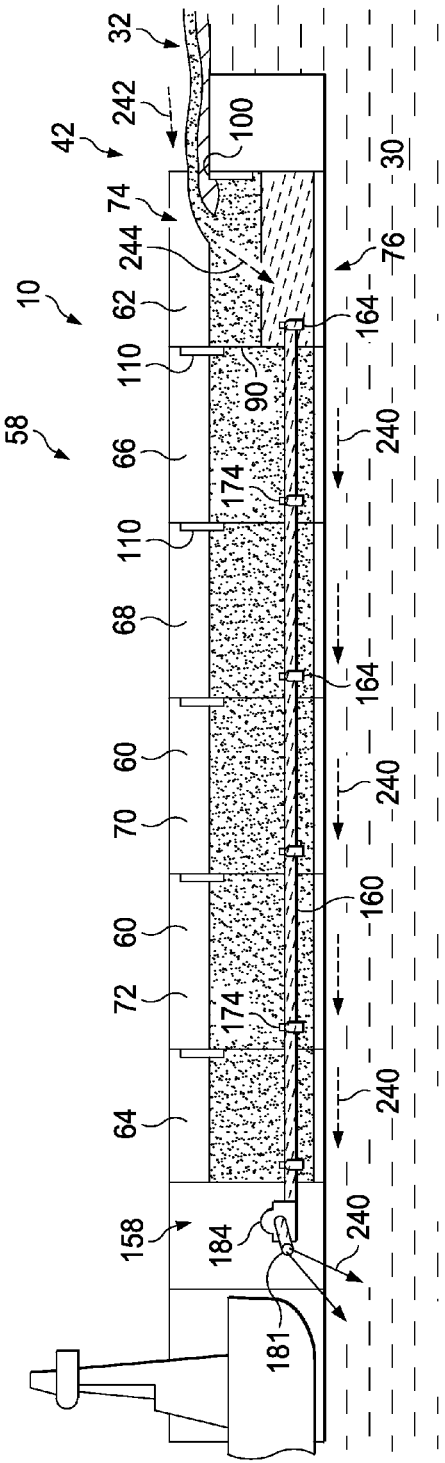
FIG. 18 is a side view of the exemplary vessel of FIG. 1 with the side shell removed to show exemplary interior cargo compartments and other components during exemplary debris recovery operations in accordance with an embodiment of the present disclosure.

In this embodiment, the above process may then be repeated for cargo compartment 68 (e.g. FIGS. 16 & 17), then cargo compartment 66 (e.g. FIGS. 17 & 18) and finally cargo compartment 62 (e.g. FIG. 18). If desired, one or more cargo compartment 60 may be skipped in the process by fluidly isolating that compartment 60 (and the other more rearward cargo compartments 60), such as described above. When substantially all sea water in the illustrated front cargo compartment 62 is removed, it is fluidly isolated, such as described above. It should be noted that the above process can be used with embodiments having any number (e.g. 2, 3, 4 etc.), form and configuration of cargo compartments 60. Thus, the methods of debris recovery of present disclosure are not limited by the number, form and configuration of compartments 60.

In accordance with many embodiments, oil 34 is separated from sea water 38 and collected as it moves across the vessel 10 and as sea water 38 is discharged from the vessel 10. In many embodiments, large amounts of floating contaminants or debris (e.g. oil) may be relatively quickly collected and removed from practically any body of water 30.

Referring back to the embodiment of FIG. 1, as the cargo compartments 60 are being emptied of sea water and at least partially filled with oil, liquid may be added to or removed from one or more of the other compartments 80, 84, 86, 88 in the vessel 10, such as to maintain the desired height of the vessel 10 in the body of water 30 (at the desired load line or other position). For example, sea water may be added to and removed from one or more of the side ballast tanks 80 on either, or both sides, of the vessel 10 as needed throughout the above debris recovery operations to maintain or refine the height of the vessel 10 in the body of water 30.

If desired, the vessel 10 may be moved in a forward direction (arrow 16, FIG. 2) through the oil spill area 36 at any desired speed, or at varying speeds, throughout, or at certain times, during the debris recovery operations. This may be desirable, for example, for strategic positioning of the front end 42 of the vessel 10 relative to the debris field or oil spill area 36 (like moving a vacuum cleaner over a dirty rug) as the discharge pump(s) 184 actively move liquid through the fluid removal system 58 as described above, to urge or assist in directing preferably oil and some oily water into the front cargo compartment 62 and through the other compartments 60, thus enhancing the active flow action caused by the discharge pump(s) 184, to cause the passive flow of liquid through the fluid removal system 58 when the discharge pumps 184 are not used, other desired purpose or a combination thereof. In the present embodiment, for example, the vessel 10 may be eased through the oil spill area 36 in the forward direction at a steady, slow speed during debris recovery operations. However, forward movement of the vessel 10 is not necessary in all embodiments.

Also during the debris recovery operations, if desired, the position of one or more of the exemplary open gates 110 may be varied as needed to affect or control the flow of liquid into the cargo compartments 60. For example, one or more of the gates 110 may be moved into one or another partially open position, such as to provide the optimal flow rate and/or liquid content (e.g. primarily oil) of the flowing liquid. If desired, the height of any of the open gates 110 relative to their associated openings 100 may be dynamically adjusted during debris recovery operations, such as via an electronic controller or computer-based control system. One or more variables, such as the weight, density and viscosity of the oil and/or other debris, substances or material in the sea water, may affect and be considered in varying the position of one or more gates 110 to achieve a desired flow rate and/or content of the liquid passing through the openings 100.

When debris recovery operations are completed, the exemplary fluid removal system 158 and all the cargo compartments 60 may be fluidly isolated from the body of water 30. For example, all the gates 110 and all valves 174, 188 may be closed and the discharge pumps 184 turned off. If desired, all the gates 110 and/or cargo compartments 60 may be substantially sealed. In some embodiments, all the gates 110 and/or cargo compartments 60 may be completely (100%) sealed. The exemplary elongated boom(s) 190 may be moved to a stowed position and the vessel 10 transported to a desired location for offloading the contents (preferably primarily oil) in the cargo compartments 60. If desired, one or more other compartments on the vessel, such as the ballast tanks 80, may be emptied, such as to raise the height of the vessel 10 in the body of water 30 as it leaves the oil spill area 36. This may be desirable, for example, to minimize further oil contamination of the exterior surface of the side shell of the vessel 10 and/or allow cleaning/removal of any oil adhered thereto.

The contents of the cargo compartments 60 may be offloaded in any suitable manner. For example, the contents of the cargo compartments 60 may be offloaded to containers on one or more other vessel or onshore. In some embodiments, the oil and oily water may be offloaded through the openings 100 or other openings (not shown) in the cargo compartments 60, such as via one or more hose or other component. In other embodiments, the oil and oily water may be offloaded through the fluid removal system 158. If desired, the tug 14 used with a first vessel 10 as described above may be used to take a second similar vessel 10 to the oil spill area 36 to recover debris while the first vessel 10 is being offloaded.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. An oil recovery vessel useful for collecting oil floating in a body of water in an oil spill area at or near the surface of the body of water, the vessel having a deck, length, width, front end, rear end and left and right sides and being moveable across the top of the body of water through the oil spill area, the vessel comprising:

a plurality of distinct cargo compartments positioned adjacent to one another along at least part of the length of the vessel and arranged and adapted to contain sea water and oil, each said cargo compartment having a width, an upper end and a lower end, a front said cargo compartment being disposed closest to the front of the vessel and a rear said cargo compartment being disposed closest to the rear of the vessel, said front cargo compartment being separated from the front end of the vessel by at least one front vertical wall and each adjacent pair of said cargo compartments being separated by at least one other vertical wall, each said vertical wall having an upper end and at least one opening formed therein proximate to said upper end thereof, each said opening being arranged and adapted to allow the flow of liquid through said associated vertical wall and into said adjacent cargo compartment aft of said vertical wall, wherein said at least one opening in said front vertical wall allows the flow of liquid from the body of water into said front cargo compartment and at least one said other opening allows the flow of liquid therefrom into each successive adjacent cargo compartment in the direction of the rear end of the vessel;

a plurality of gates, at least one said gate arranged and adapted to allow and disallow the flow of fluid through at least one said opening formed in each said vertical wall, each said gate being selectively movable between at least one open and at least one closed position, each said gate in said at least one open position allowing the flow of liquid through said at least one associated opening and each said gate in said at least one closed position disallowing the flow of liquid through said at least one associated opening, wherein when said at least one gate associated with all of said openings in any of said vertical walls is in said closed position, said adjacent cargo compartment aft of said at least one gate is substantially sealed from liquid entering said cargo compartment through said at least one respective associated opening;

at least one at least partially floating, elongated, boom disposed proximate to the front end of the vessel, said at least one boom being arranged and adapted to encourage oil to flow into said front cargo compartment from the body of water; and at least one suction conduit being fluidly coupled to each said cargo compartment to concurrently allow sea water to be removed from any one of said cargo compartments therethrough and oil to enter and substantially fill said respective cargo compartment through said at least one opening in said adjacent foremost vertical wall.

2. The vessel of claim 1 wherein said at least one gate associated with each said at least one opening includes at least one elongated plate arranged and adapted to be selectively moveable upwardly over said at least one opening into said at least one closed position and downwards therefrom into a fully open position.

3. The vessel of claim 2 wherein each said gate is moveable upwardly from said fully open position to any among a plurality of partially open positions, each said gate in each said partially open position being configured to block a distinct lower portion of said at least one associated opening.

4. The vessel of claim 1 further including at least one wave dampener disposed within at least one said cargo compartment and being pivotably coupled to said vertical wall that is disposed immediately forward of said cargo compartment.

5. The vessel of claim 4 further including at least one wave dampener disposed within each said cargo compartment, wherein each said wave dampener is arranged and adapted to reduce the size of waves or turbulence caused thereby in liquid entering said associated cargo compartment through said at least one said opening in said vertical wall that is disposed immediately forward of said cargo compartment.

6. The vessel of claim 5 wherein each said wave dampener includes at least one elongated float pivotably coupled to each said gate and extending at least partially across the width of said associated cargo compartment, each said float arranged and adapted to float on the surface of the liquid in said cargo compartment.

7. The vessel of claim 1 wherein said at least one suction conduit extends lengthwise relative to the vessel and at least partially through said cargo compartments, said at least one suction conduit being fluidly coupled to each said cargo compartment proximate to said lower end thereof to allow sea water to be selectively removed from each said cargo compartment from said lower end thereof.

8. The vessel of claim 7 further including distinct first and second inlet openings disposed within each respective said cargo compartment proximate to said lower end thereof and fluidly coupled to said at least one suction conduit, each said inlet opening facing downwardly in said associated cargo compartment.

9. The vessel of claim 8 further including a remotely actuated fluid valve associated with at least one among said first and second inlet openings in each said cargo compartment, each said valve being moveable between at least one open and at least one closed position, each said valve in said at least one open position allowing the flow of fluid from said associated cargo compartment through said associated at least one inlet opening and into said at least one suction conduit, and each said valve in said at least one closed position disallowing the flow of fluid from said associated cargo compartment through said associated at least one inlet opening and into said at least one suction conduit.

10. The vessel of claim 8 further including a plurality of oily water sensors, at least one said oily water sensor disposed within each said cargo compartment proximate to at least one inlet opening therein and arranged and adapted to detect oil in the liquid entering said at least one inlet opening from said cargo compartment.

11. The vessel of claim 1 wherein said at least one suction conduit fluidly communicates with the body of water through at least one discharge opening disposed aft of said rear cargo compartment, further including at least one discharge pump fluidly coupled to said at least one suction conduit and arranged and adapted to draw fluid from at least one said cargo compartment, into said at least one suction conduit and out said at least one discharge opening.

12. The vessel of claim 1 wherein said at least one elongated boom includes at least first and second elongated booms, said first and second elongated booms being movable between at least one stowed position and at least one deployed position, said first and second elongated booms in said at least one deployed position extending angularly outwardly from the vessel away from the front end of the vessel, said first elongated boom extending angularly outwardly relative to the vessel proximate to the left side of the vessel and said second elongated boom extending angularly outwardly relative to the vessel proximate to the right side of the vessel, said first and second elongated booms in said at least one deployed position forming a funnel shape to allow oil to be funneled into said front cargo compartment from the oil spill area.

13. The vessel of claim 1 wherein each said elongated boom is pivotably coupled to the vessel to allow said elongated boom to move up and down relative to the vessel in response to wave action.

14. The vessel of claim 13 wherein each said elongated boom includes a plurality of interconnected, elongated, articulating sections, each said articulating section being arranged and adapted to move up and down relative to one or more adjacent said articulating sections in response to wave action.

15. The vessel of claim 14 wherein each said elongated boom includes and inner side and an outer side, said inner side of each said elongated boom being closest to the vessel, further including at least one hinge pin at least partially connecting each adjacent pair of said articulating sections of each said elongated boom together and at least one flexible, fluidly impermeable cover extending over said at least one hinge pin on said inner side of said boom and partially across said adjacent articulating sections proximate to said at least one hinge pin.

16. The vessel of claim 1 wherein the vessel is submergible in the body of water to a desired load line, further including at least one recessed front deck portion extending forward of said front vertical wall, each said elongated boom being coupled to said at least one recessed deck portion, further wherein when the vessel is submerged to the desired load line, said at least one recessed deck portion is arranged and adapted to be submerged in the body of water and said at least one elongated boom and said openings in said front vertical wall are partially submerged in the body of water so that liquid on the surface of the body of water is in direct fluid communication with said first cargo compartment.

17. System for collecting oil on a waterborne vessel from an oil spill area at or near the surface of a body of water, the vessel having a front end and a rear end, the system comprising:
- at least three successively fluidly coupled cargo compartments configured to initially hold sea water and thereafter hold primarily oil, a front said cargo compartment being disposed closest to the front end of the vessel, a rear said cargo compartment being disposed closest to the rear end of the vessel and at least one intermediate said cargo compartment being disposed between said front and rear cargo compartments;
- a plurality of fluid passageways, at least a first said fluid passageway fluidly coupling said front cargo compartment with the body of water and configured to allow liquid flow into said front cargo compartment from the body of water, at least a second said fluid passageway fluidly coupling said front cargo compartment and said forward-most intermediate cargo compartment and configured to allow liquid flow from said front cargo compartment into said forward-most intermediate cargo compartment, and if there is more than one said intermediate cargo compartment, at least a third said fluid passageway fluidly coupling each pair of successively fluidly coupled said intermediate cargo compartments in the direction of the rear end of the vessel and configured to allow liquid flow from the forward-most of each said pair of intermediate cargo compartments to the aft-most of each said pair of intermediate cargo compartments, and at least one other said fluid passageway fluidly coupling said aft-most intermediate cargo compartment and said rear cargo compartment to allow liquid flow into said rear cargo compartment from said aft-most intermediate cargo compartment;
- at least one suction conduit being fluidly coupled to each said cargo compartment and configured to allow each said cargo compartment, starting with said rear cargo compartment, to be concurrently at least substantially emptied of sea water therethrough and at least substantially filled with oil,
- wherein each said cargo compartment has an upper end and a lower end, wherein each said fluid passageway passes through a vertical wall proximate to said upper end of at least two said cargo compartments and said at least one suction conduit is arranged to remove sea water from each said cargo compartment proximate to said lower end thereof; and
- at least one fluid discharge pump fluidly coupled to said at least one suction conduit, said at least one fluid discharge pump arranged and adapted to concurrently draw sea water out of each said cargo compartment through said at least one suction conduit and draw oil into said cargo compartment through said at least one associated passageway until said cargo compartment is substantially full of oil, starting with said rear cargo compartment and ending with said front cargo compartment.

18. Method of collecting oil on a waterborne vessel from an oil spill area at or near the surface of a body of water, the vessel having a front end and a rear end, the method comprising:
- (a) at least substantially filling at least three successively fluidly interconnected cargo compartments on the vessel with sea water, a front cargo compartment being disposed closest to the front end of the vessel, a rear cargo compartment being disposed closest to the rear end of the vessel and at least one intermediate cargo compartment being disposed between the front and rear cargo compartments;
- (b) positioning the front end of the vessel in or adjacent to the oil spill area;
- (c) at least a first fluid passageway allowing oil and some sea water to enter the front cargo compartment proximate to the upper end thereof from the body of water;
- (d) at least second and third fluid passageways allowing oil and some sea water to pass from the front cargo compartment into the upper end of each successively fluidly coupled cargo compartment, respectively;
- (e) at least one fluid discharge pump concurrently pumping sea water out of the rear cargo compartment through at least one suction conduit and allowing oil and some sea water to enter the rear cargo compartment from the aft-most intermediate cargo compartment;
- (f) after the rear cargo compartment is substantially filled with oil, fluidly isolating the rear cargo compartment from the other cargo compartments;
- (g) at least one fluid discharge pump concurrently pumping sea water out of the aft-most intermediate cargo compartment through at least one suction conduit and allowing oil and some sea water to enter the aft-most intermediate cargo compartment from next successive cargo compartment that is fluidly coupled thereto in the direction of the front end of the vessel;
- (h) after the aft-most intermediate cargo compartment is substantially filled with oil, fluidly isolating the aft-most intermediate cargo compartment from the other substantially water-filled cargo compartments;
- (i) repeating the acts of elements (g) and (h) for any additional intermediate cargo compartments and then the front cargo compartment; and
- (j) after the front cargo compartment is substantially filled with oil, fluidly isolating the front cargo compartment from the body of water.

19. The method of claim 18 further including
- deploying at least one at least partially floating, elongated, boom from the front end of the vessel, and
- the at least one boom funneling oil into the front cargo compartment.

\* \* \* \* \*